United States Patent [19]

Sakurai

[11] Patent Number: 4,710,826

[45] Date of Patent: Dec. 1, 1987

[54] APPARATUS WITH LIQUID CRYSTAL DISPLAY PANEL, FOR RECORDING/PLAYING BACK TELEVISION SIGNAL BY UTILIZING DIGITAL AUDIO TAPE RECORDER SYSTEM

[75] Inventor: Keiichi Sakurai, Tokyo, Japan

[73] Assignee: Casio Computer Co., Ltd., Tokyo, Japan

[21] Appl. No.: 872,224

[22] Filed: Jun. 9, 1986

[30] Foreign Application Priority Data

Jun. 18, 1985 [JP] Japan ................. 60-132419

[51] Int. Cl.[4] .............................. H04N 5/92
[52] U.S. Cl. ..................... 360/9.1; 360/32; 369/10
[58] Field of Search ............... 358/310, 335, 320, 337, 358/339; 360/8, 9.1, 32

[56] References Cited

U.S. PATENT DOCUMENTS

| | | | |
|---|---|---|---|
| 3,919,716 | 11/1975 | Yumde et al. | 360/9.1 |
| 4,138,694 | 2/1979 | Doi et al. | |
| 4,475,131 | 10/1984 | Nishizawa et al. | 358/335 |
| 4,523,232 | 6/1985 | Kameda et al. | |
| 4,523,237 | 6/1985 | Fukuda et al. | |
| 4,539,605 | 9/1985 | Hoshino et al. | |
| 4,542,418 | 9/1985 | Yoneyama et al. | |
| 4,542,419 | 9/1985 | Morio et al. | |
| 4,549,230 | 10/1985 | Odaka | 360/8 |

Primary Examiner—Donald McElheny, Jr.
Attorney, Agent, or Firm—Frishauf, Holtz, Goodman & Woodward

[57] ABSTRACT

A television video signal is compressed to the number of digital video signals sufficient for display of an image on a liquid crystal display. A television audio signal is also sampled and digitized. The television video and audio signals are combined to produce a digital television signal. The audio signal is sampled and digitized to produce the digital audio signal. The rotational speed of a rotary drum having record/playback heads in the digital television signal record/playback mode is different from that in the digital audio signal record/playback mode. By utilizing a digital audio tape recorder (DAT), the digital television and audio signals can be selectively recorded or played back.

20 Claims, 73 Drawing Figures

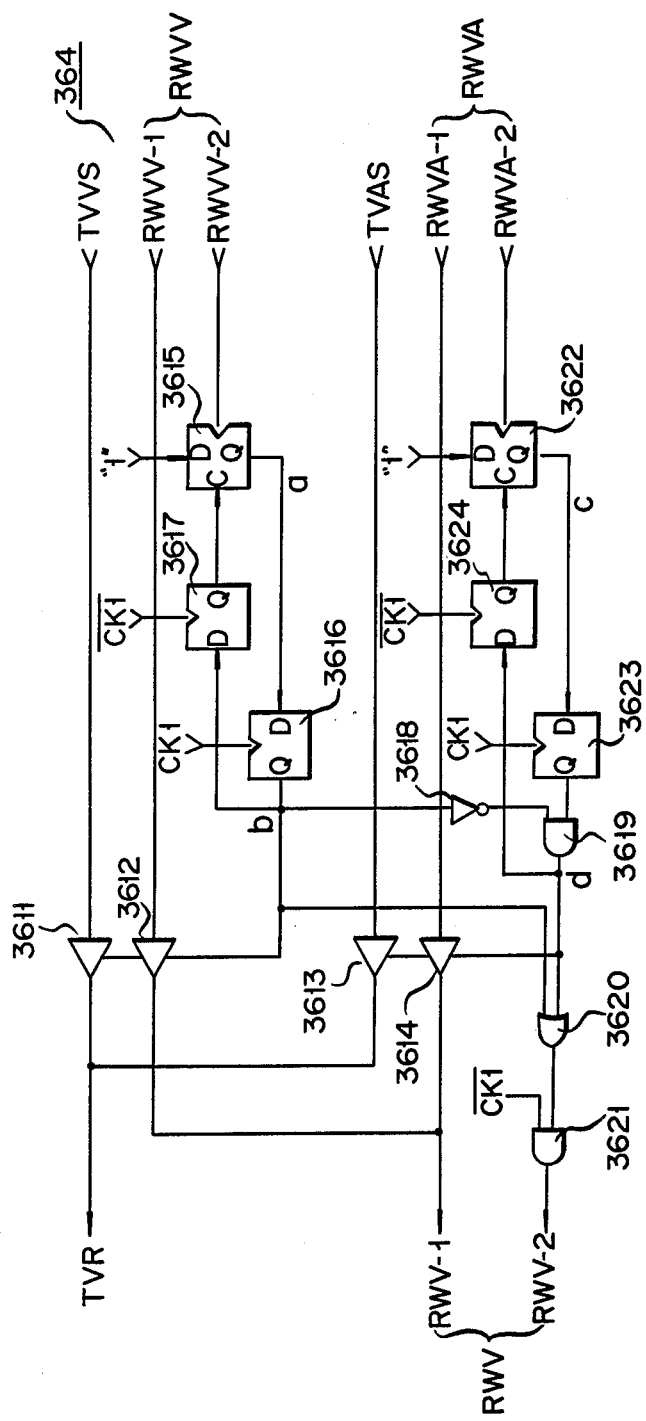
F I G. 5

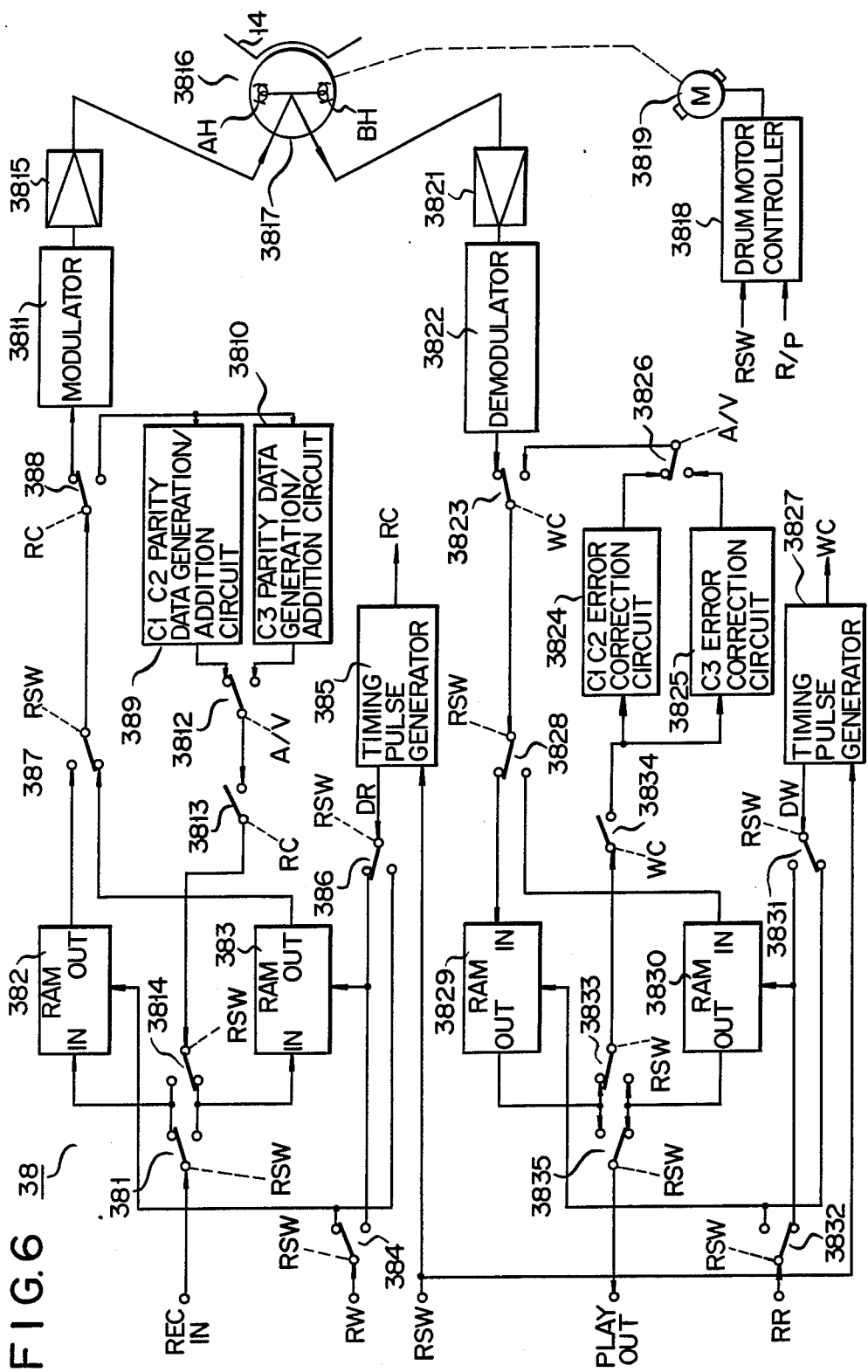

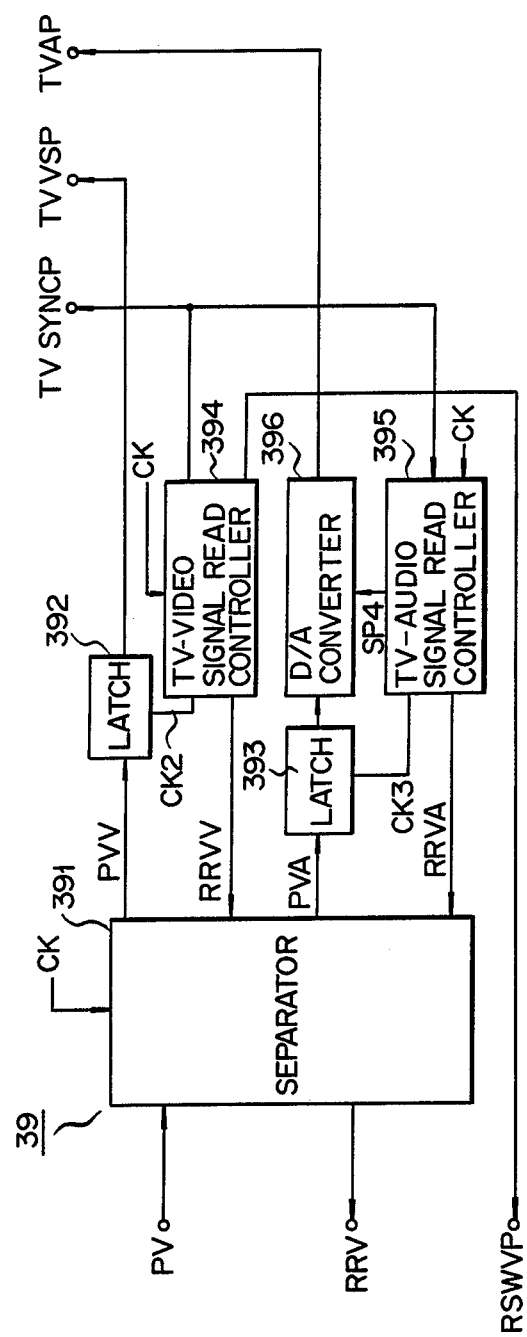
F I G. 9

F I G. 12A
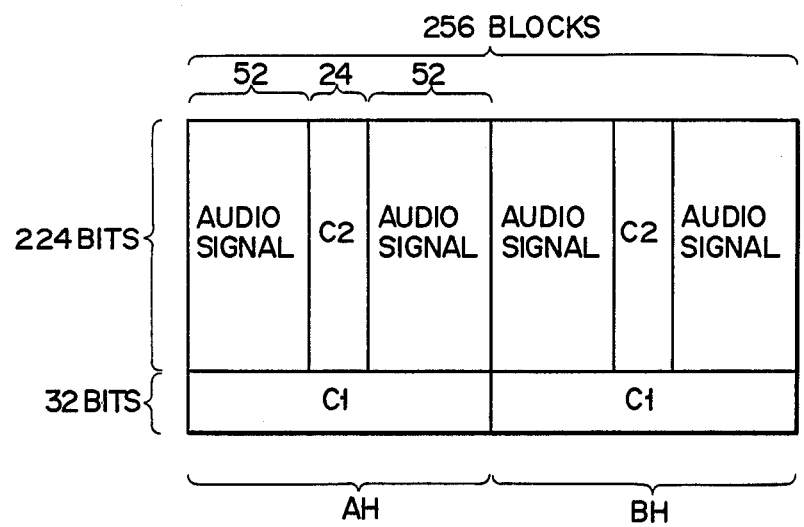
F I G. 12B
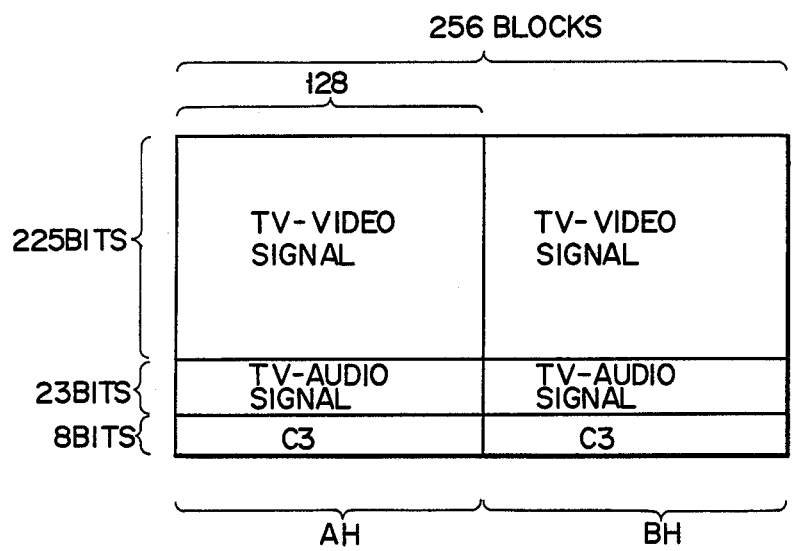

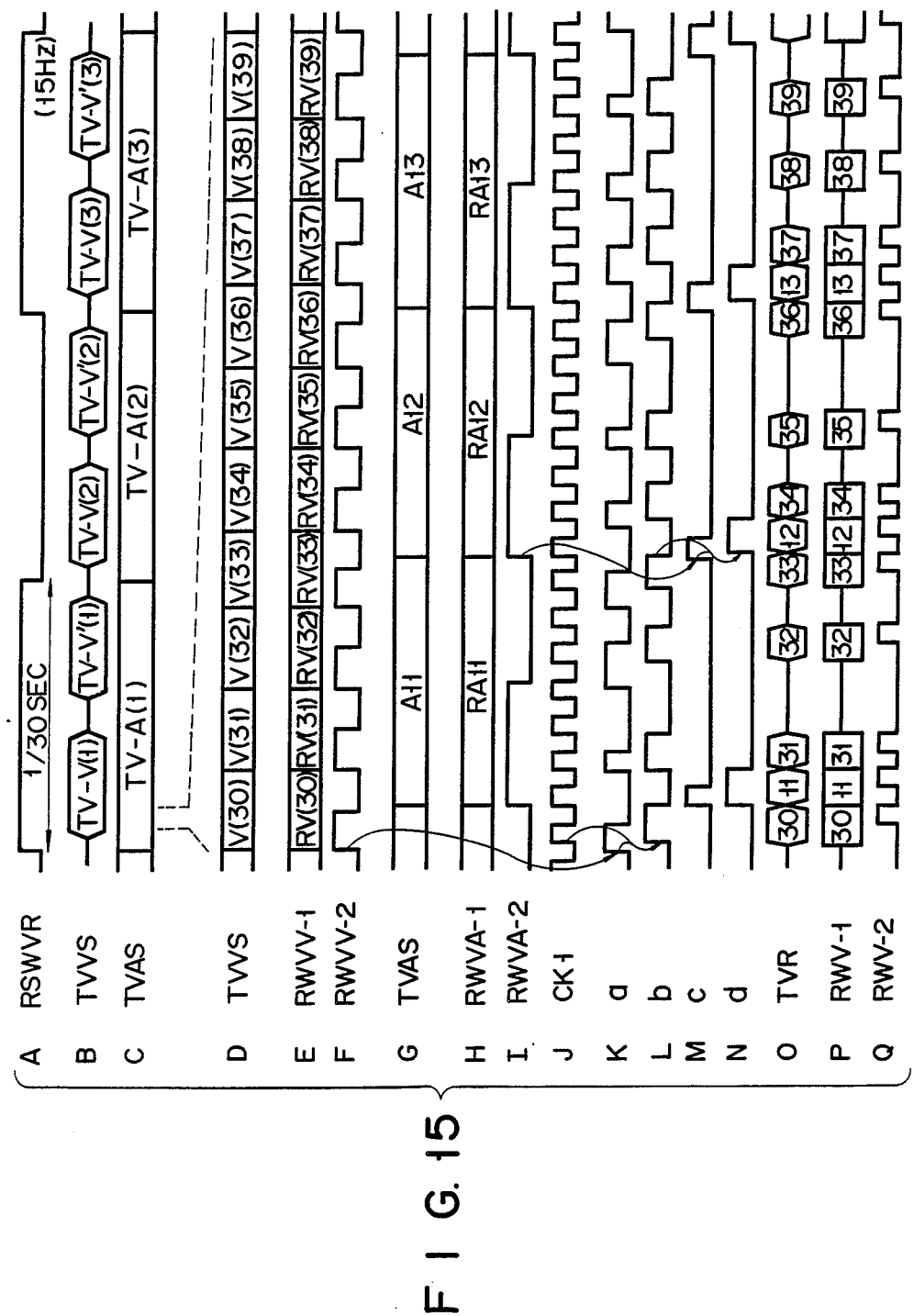
F I G. 15

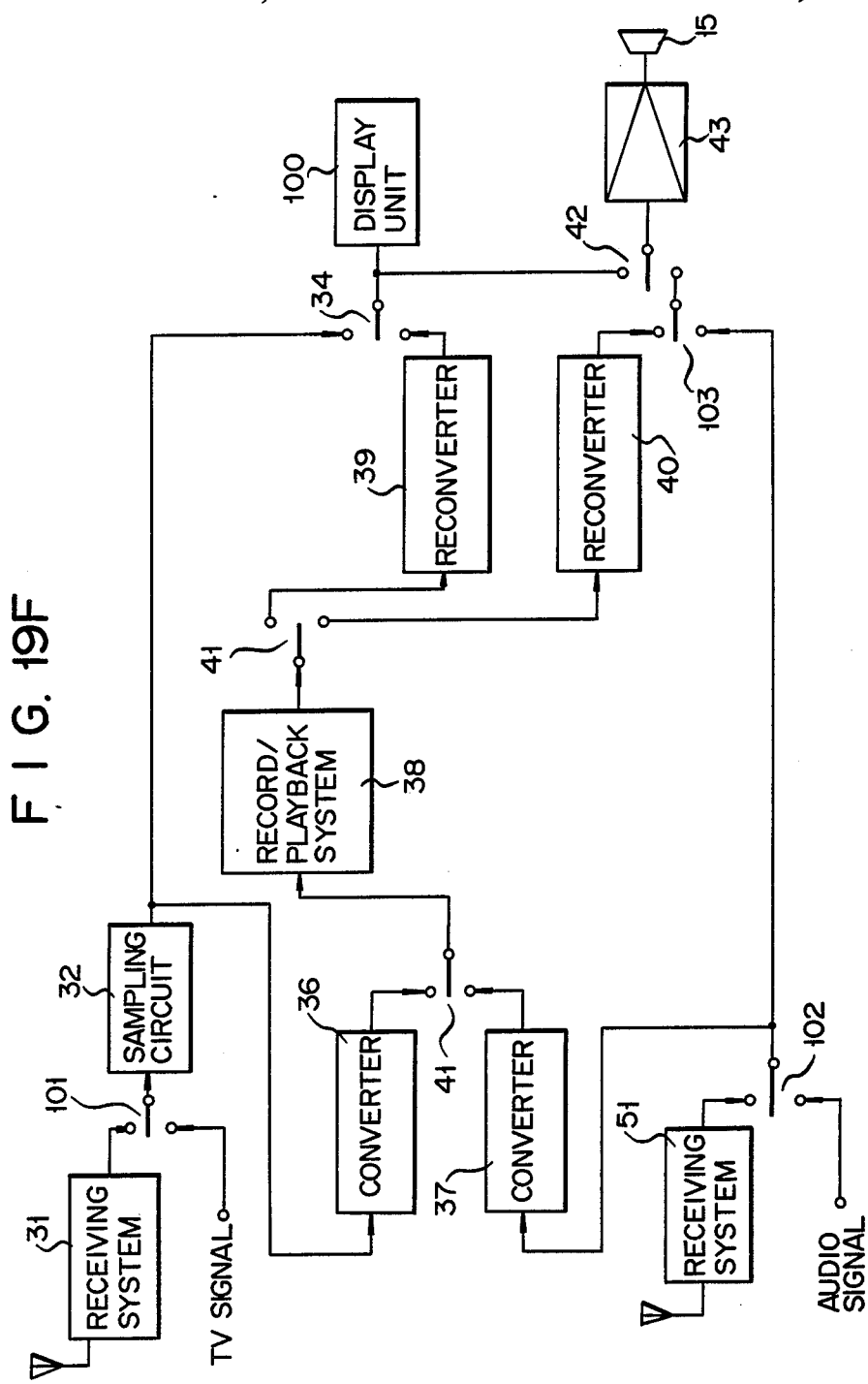

APPARATUS WITH LIQUID CRYSTAL DISPLAY PANEL, FOR RECORDING/PLAYING BACK TELEVISION SIGNAL BY UTILIZING DIGITAL AUDIO TAPE RECORDER SYSTEM

BACKGROUND OF THE INVENTION

The present invention relates to an apparatus having a liquid crystal display panel, for recording/playing back a television signal by utilizing a digital tape recorder system.

Along with the recent rapid advances in AV (audiovideo) equipment, various types of apparatuses have become commercially available.

A home VTR (video tape recorder) has been developed to meet the need for watching a TV program, not at the time of broadcasting, but at a desired time. Such home VTRs have grown very popular and are in widespread use. A home VTR records analog video signals on a magnetic tape. High-performance Hi-Fi video recorders, improvement similar products, are also commercially available. A Hi-Fi video recorder records on the magnetic tape frequency-modulated TV-video and TV-audio signals, thus recording and reproducing an image with high resolution. The Hi-Fi VTR has a complicated circuit arrangement and is thus bulky.

Demand has also arisen for apparatuses which can receive a TV broadcast at any location. In order to satisfy this demand, liquid crystal television sets have been developed and manufactured, as described in U.S. Patent No. 4,523,232 issued to Osamu Kameda and Takahiro Fuse. If TV programs are regarded as an information source, a minimum image resolution is satisfactory. The liquid crystal television receivers now commercially available have been developed based on this assumption.

Strong demand has also arisen for high-quality audio equipment. Extensive studies on DATs (Digital Audio Tape Recorders) have been recently made to answer the above demand, as described in U.S. Pat. No. 4,523,237 issued to S. Fukuda, and U.S. Pat. No. 4,539,605 issued to T. Hoshino. DAT systems are classified into a stationary head type DAT (S-DAT) and a rotary head type DAT (R-DAT). According to the DAT system, an analog audio signal is recorded in the form of a PCM signal on a DAT tape. The PCM signal is played back in the form of an analog audio signal. The DAT system can record and play back PCM signals with higher fidelity them a conventional analog recording system.

U.S. Pat. No. 4,138,694 issued to T. Doi and A. Iga, U.S. Pat. No. 4,542,418 issued to S. Yoneyama et. al., and U.S. Pat. No. 4,542,419 issued to M. Morio et. al. disclose examples of an apparatus for recording an analog audio signal in the form of a PCM signal on a given tape to achieve recording and playback with high fidelity, and for selectively recording a video signal on the given tape. The video signal is, however, recorded as an analog signal in these systems since a digital video signal requires a wide bandwidth and cannot be recorded on the DAT tape.

Demand has thus arisen for an apparatus for recording and playing back TV programs from any location to allow collection of information from these programs and for producing sounds with high quality.

SUMMARY OF THE INVENTION

The present invention has been made in consideration of the above situation, and has as its object to provide a simple, compact magnetic recording/playback apparatus with a liquid crystal display panel, wherein audio and television signals can be recorded and reproduced using a DAT mechanism.

In order to achieve the above object of the present invention, there is provided an apparatus for selectively recording/playing back television and audio signals by using a digital audio tape recorder (DAT) system incorporating a RAM, comprising:

television signal format converter means for converting an analog TV audio signal input from the external to a digital TV audio signal in response to a TV sync signal input from the external, outputting a digital TV signal comprising digital TV video signal input from the external and the converted digital TV audio signal as a recording digital TV signal, and generating TV signal recording control signals RW (RAM-write control signal) and RSW (RAM designation switching signal);

audio signal format converter means for converting an analog audio signal input from the external to a digital audio signal and outputting the digital audio signal as a recording digital audio signal, and for generating audio signal recording control signals RW and RSW, said signal RSW having a frequency different from that of the TV signal recording control signal RSW;

television signal format reconverter means for generating TV signal playback control signals RR (RAM read control signal) and RSW and the playback TV sync signal, for receiving and separating a playback digital TV signal into a playback digital TV video signal and a playback digital TV audio signal, and for converting the playback digital TV audio signal to a playback analog TV audio signal to output the playback digital TV video signal and the playback analog TV audio signal, the TV signal playback control signal RSW having the same frequency as that of the TV signal recording control signal RSW;

audio signal format reconverter means for generating an audio signal playback control signal RR in response to the signal RSW from said audio signal format converter means, and for converting the input playback digital audio signal to a playback analog audio signal and outputting the playback analog audio signal;

first switching means for selectively outputting the signal RSW from said television signal format reconverter means and the signal RSW from said television signal format converter means in response to the DAT tape drive instruction;

liquid crystal display means, having an N×M dot matrix, for displaying a television image according to the digital TV video signal in response to the TV sync signal;

second switching means, to be selected according to one signal to be processed of TV signal and audio signal;

audio output means for selectively receiving and amplifying one of the analog audio signal and the analog TV audio signal and for generating an amplified audio;

third switching means, to be selected according to the digital TV video signal to be displayed on said liquid crystal display means, for selectively outputting one of a couple of the TV sync signal and the digital TV video signal input from the external, and a couple of the playback TV sync signal and the playback digital TV video signal from said television signal format reconverter means to said liquid crystal display means as digital TV video signal and TV sync signal, and for selectively outputting one of the analog TV audio signal input from the external and the playback analog TV audio signal from said television signal format reconverter means as the analog TV audio signals;

DAT tape driving means for driving a rotary head according to the frequency of the signal RSW in response to the DAT tape drive instruction, reading a playback digital signal with parity data from said DAT tape in response to the read instruction in the DAT tape drive instruction, and writing a recording digital signal with parity data on said DAT tape in response to the write instruction in the DAT tape drive instruction;

fourth switching means, switched in response to selection of said second switching means, for selectively outputting one of a group of signal RR from said television format reconverter means, signal RW and the recording digital TV signal from said television signal format converter means and signal RSW from said first switching means, and a group of signal RR from said audio signal reconverter means and signal RW, the recording digital audio signal and signal RSW from said audio signal converter means to signal recording/playback processing means as signal RR, signal RW, the recording digital signal and signal RSW, respectively, and for selectively supplying the playback digital signal input thereto to said television signal format reconverter means as the playback digital TV signal and said audio signal format reconverter means as the playback digital audio signal, and for selectively outputting one of the analog audio signal and the TV audio signal from said third switching means to said audio output means; and signal recording/playback processing means, having a RAM devided into four RAM portions, for selectively storing the recording digital signal from said fourth switching means to first and second RAM portions in response to the signal RW from said fourth switching means based on the signal RSW from said fourth switching means, for adding different parity data to the recording digital signal according to selection of said second switching means, for selectively supplying the digital signal with parity data stored in one of said first and second RAM portions as the recording digital signal with parity data to said DAT tape driving means in response to the signal RSW, and for selectively supplying the playback digital signal with parity data from said DAT tape driving means to third and fourth RAM portions in response to the signal RSW, checking the parity data in the playback digital signal with parity data in response to the signal RR from said fourth switching means based on the signal RSW and the selection of said second switching means, correcting the playback digital signal if a parity error is detected, and outputting the playback digital signal free from the parity error to said fourth switching means.

In order to achieve the above object of the present invention, there is also provided an apparatus for recording/playing back a signal with a sync signal by using a digital audio tape recorder (DAT) system, comprising:

first control signal generating means for generating first and second control signals according to the sync signal to record the input signal;

converting means for converting an input signal to a PCM signal having a predetermined bit length within 256 bits and a predetermined block size within 256 blocks in response to the first and second control signals;

DAT tape driving means for driving a rotary head in response to a fourth control signal of a frequency based on that of a selected one of the first control signal and a third control signal based on the DAT tape drive instruction, outputting the playback digital signal from said DAT tape in response to a read instruction in the DAT tape drive instruction, and writing an input recording digital signal on said DAT tape in response to a write instruction in the DAT tape drive instruction;

PCM signal recording/playback processing means for receiving the PCM signal converted according to the first and second control signals, supplying the recording digital signal derived from the PCM signal to said DAT tape driving means in response to the fourth control signal, receiving the playback digital signal from said DAT tape driving means in response to the fourth control signal, and outputting a playback PCM signal derived from the playback digital signal in response to the third control signal and a fifth control signal;

second control signal generating means for generating the third and fifth control signals and the playback sync signal to playback the playback PCM signal; and reconverting means for reconverting the playback PCM signal from said PCM signal recording/playback processing means to the same signal as input to said converting means.

According to the present invention as described above, the television video signal is compressed to the number of digital signals sufficient for display on a liquid display panel. Similarly, the audio signal is compressed in the same manner. By combining the television receiver and the DAT, the television and audio signals can be recorded and played back using the DAT mechanism. The rotational speed of the rotary drum incorporating a record/playback head at the time of recording or playback of the television signal is different from that at the time of recording or playback of the audio signal. Thus, there is provided a simple, compact magnetic recording/playback apparatus with a liquid display panel.

BRIEF DESCRIPTION OF THE DRAWINGS

FIG. 5 is a detailed block diagram of a selector in FIG. 4;

FIG. 6 is a detailed block diagram of a record/playback system in FIG. 2;

FIG. 9 is a detailed block diagram of a TV signal format reconverter shown in FIG. 2;

FIG. 12A is a data format for recording an audio signal;

FIG. 12B is a data format for recording a television signal;

FIGS. 13A to 13E are respectively timing charts for explaining the audio signal playback mode;

FIGS. 15A to 15Q are respectively timing charts for explaining the operation of the TV signal format converter;

FIGS. 19A to 19F are respectively block diagrams showing other embodiments of the present invention.

DETAILED DESCRIPTION OF THE PREFERRED EMBODIMENTS

In order to best understand the present invention, general DAT standards will be described below.

A DAT (digital audio tape recorder) conference was established in 1981 to achieve DAT design standardization. DATs are classified into a stationary head type DAT (S-DAT) and a rotary head type DAT (R-DAT). The R-DAT is considerately used as commercial equipment since it can employ known ½ inch VTR techniques. Both the S- and R-DATs have a 48-kHz sampling frequency and 16-bit quantization. A DAT tape has a width of 3.81 mm and a tape cassette for R-DAT is 73×54×10.5 mm³. A R-DAT head drum has a diameter of 30 mm, a speed of 2,000 rpm, and a tape winding angle of 90 degrees. One track (one record of one head, a 23.501-mm tape portion of 7.5-ms period) is divided into 196 blocks. PCM data including parity data constitutes 128 blocks. One block consists of 288 bits.

A magnetic recording/playback apparatus with a liquid crystal display panel according to an embodiment of the present invention will be described with reference to the accompanying drawings. This embodiment exemplifies an R-DAT. The outer appearance of the apparatus, its electrical circuits, and the operation of the electrical circuits will be described.

Figure 1:
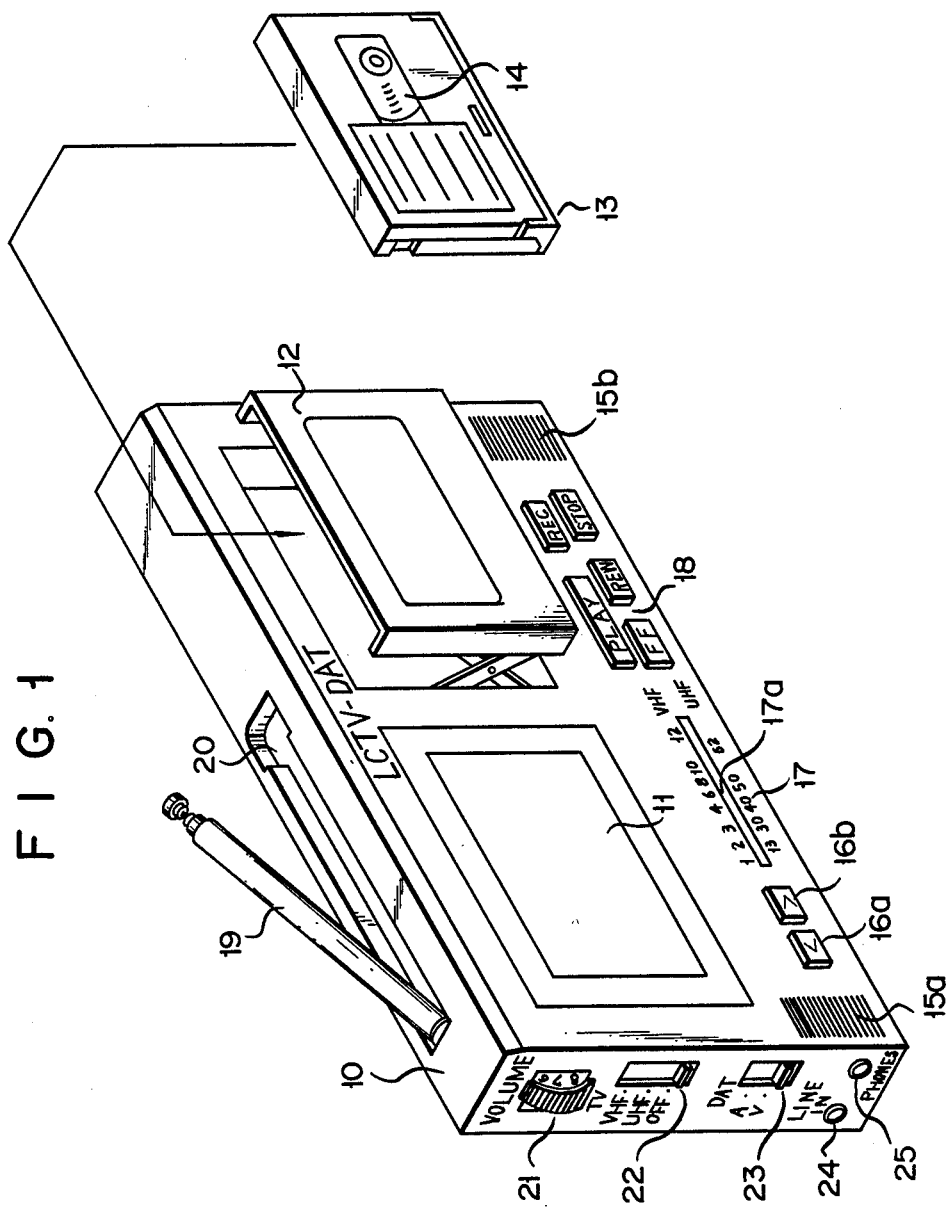
FIG. 1 is a perspective view showing an outer appearance of a magnetic recording/playback apparatus with a liquid crystal panel according to an embodiment of the present invention.

The outer appearance of the magnetic recording/playback apparatus with a liquid crystal panel according to an embodiment of the present invention will be described with reference to FIG. 1. Case 10 has dimensions of, e.g., 220×120×20 mm. Liquid crystal display panel 11 of 120×160 dots and DAT cassette holder 12 are respectively arranged in the left and right portions of the front surface of case 10. Rotary head type DAT mechanisms (not shown), such as a drum and a loading mechanism, are arranged in positions corresponding to holder 12 inside case 10. DAT tape cassette 13 is loaded in holder 12. Tape cassette 13 has dimensions of 73×54×10.5 mm. 3.81-mm wide DAT tape 14 is loaded in cassette 13. L- and R-channel speakers 15a and 15b are respectively arranged in the lower left and right corners of the front surface inside case 10. TV tuning keys 16a and 16b, and VHF and UHF tuning dial 17 are arranged below display panel 11. A tuned station is indicated by indicator 17a of dial 17. Tape drive control switches 18 for playback, record, fast forward, rewind and stop functions are arranged below holder 12 on the front surface of case 10. Rod antenna 19 is mounted at the upper portion of case 10. Antenna groove 20 is formed in the upper surface of case 10 so that antenna 19 can be fitted in groove 20 when it is not in use. Volume control 21, TV band switch 22 for selecting the VHF or UHF TV band, mode switch 23 for selecting audio mode A or video mode V in the record/playback mode, DAT external line input terminal 24 for receiving an external audio signal, and a headphone terminal 25 are arranged at one side of case 10.

Figure 2:
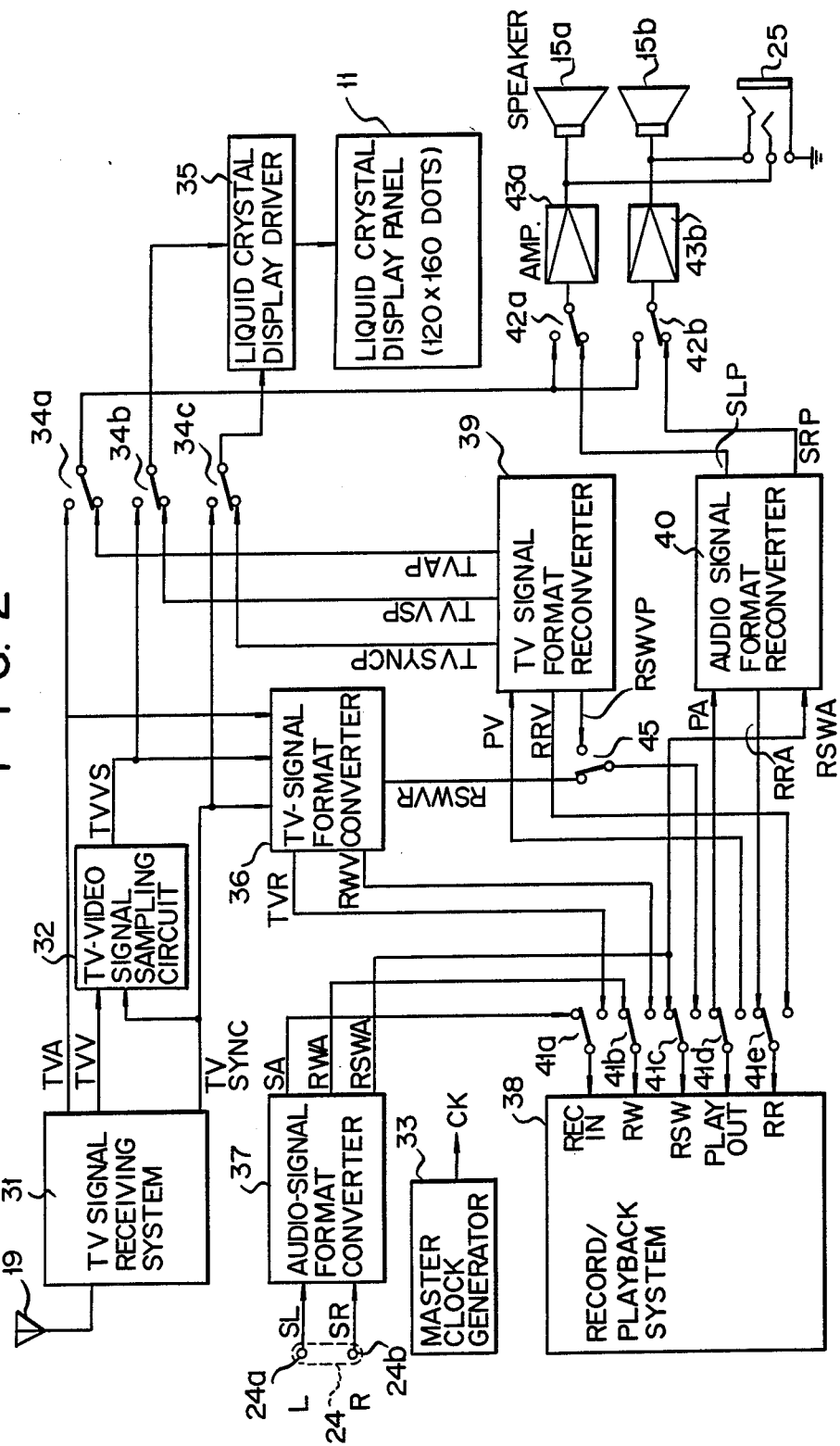
FIG. 2 is a block diagram showing the overall circuit arrangement of the apparatus in FIG. 1.

The block diagram of the electronic circuit in case 10 will be described in detail with reference to FIG. 2. As seen in FIG. 2, the magnetic recording/playback apparatus with a liquid crystal display panel in FIG. 1 includes TV signal receiving system 31, TV video signal sampling circuit 32, TV signal format converter 36, TV signal format reconverter 39, switch circuits 34a to 34c interlocked with TV band switch 22, liquid crystal display driver 35, liquid crystal display panel 11, audio signal format converter 37, audio signal format reconverter 40, record/playback system 38, master clock generator 33, switch circuits 42a and 42b interlocked with mode switch 23, amplifiers 43a and 43b, and speakers 15a and 15b.

The general operation of the apparatus having the above arrangement will be described below. A television or TV signal is processed in the following manner. System 31 selects and amplifies a radio wave of a TV station tuned by tuning keys 16a and 16b from among the TV station radio waves received by antenna 19. System 31 then separates the input TV signal into signal TVV (TV video signal), signal TVA (TV audio signal), and sync signal TVSYNC. Signals TVV and TVSYNC from system 31 are supplied to sampling circuit 32. Sampling circuit 32 samples signal TVV in response to clock pulses CK from clock generator 33, and outputs signal TVVS (TV video sampling signal). Signal TVVS and sync signal TVSYNC are supplied to switch circuits 34b and 34c and then to driver 35. Driver 35 drives display panel 11 to display an image represented by signal TVVS. Signal TVA from system 31 is supplied to switch circuit 34a and then to switch circuits 42a and 42b Signal TVA is then supplied to amplifiers 43a and 43b. and is produced at speakers 15a and 15b. Switch circuits 34a to 34c in FIG. 2 are interlocked with TV band switch 22. Switch circuits 34a to 34c are switched to supply signal TVA from system 31 to driver 35 and switch circuits 42a and 42b when switch 22 selects the VHF or UHF TV band. However, when switch 22 is turned OFF, switch circuits 34a to 34c are switched to supply a signal from reconverter 39. Switch circuits 42a and 42b are switch-interlocked with mode switch 23 in FIG. 1. If video mode V is selected, switch circuits 42a and 42b are switched to supply signal TVA from system 31 to amplifiers 43a and 43b. However, if audio mode A is selected, switch circuits 42a and 42b are switched to supply a signal from reconverter 40 to amplifiers 43a and 43b.

The USA and Japan TV signal transmission system is to transmit ½ frame per 1/60 second, i.e., one frame per 1/30 second. The number of scanning lines for one frame is 525. However, the number of effective scanning lines is about 480. In order to display a TV image on the liquid display panel of a dot matrix, 240 scanning electrodes are required. Since the ratio of length of the screen to width is 3:4, a required number of display dots is 240×320. However, in a very small liquid crystal display panel used in a pocketable television receiver, it is difficult to provide 240×320 dots. Therefore, for example, 120×160 dots are used to display one frame on a liquid crystal display panel in a pocketable television receiver. This number of dots can provide an image with satisfactory resolution if a 3" screen is used.

The flow of signals in the TV signal record mode will be described. Signal TVA and sync signal TVSYNC from system 31 are supplied together with signal TVVS from sampling circuit 32 to TV signal format converter 36. Signal TVR (TV signal for record) converted by converter 36 is selected by switch circuit 41a and signal RWV (RAM write control signal for TV signal) is selected by switch circuit 41b. The selected signals are supplied to record/playback system 38. Signal RSWVR (RAM designation switching control signal for TV recording signal) from converter 36 is selected by switch circuit 45 and then switch circuit 41c. The selected signal is supplied to system 38. In the above description, switch circuits 41a to 41c together with switch circuits 41d and 41e (to be described later) are switch-interlocked with mode switch 23 (FIG. 1). If mode switch 23 selects audio mode A, switch circuits 41a to 41c are switched to select the audio signal. However, if mode switch 23 selects video mode V, they are switched to select the TV signal. Switch circuit 45 is switch-interlocked with TV band switch 22. If the VHF or UHF TV band is selected, switch circuit 45 is switched to select the signal from converter 36. However, if switch 22 is turned OFF, switch circuit 45 is switched to supply the signal from reconverter 39 to system 38.

Figure 11:
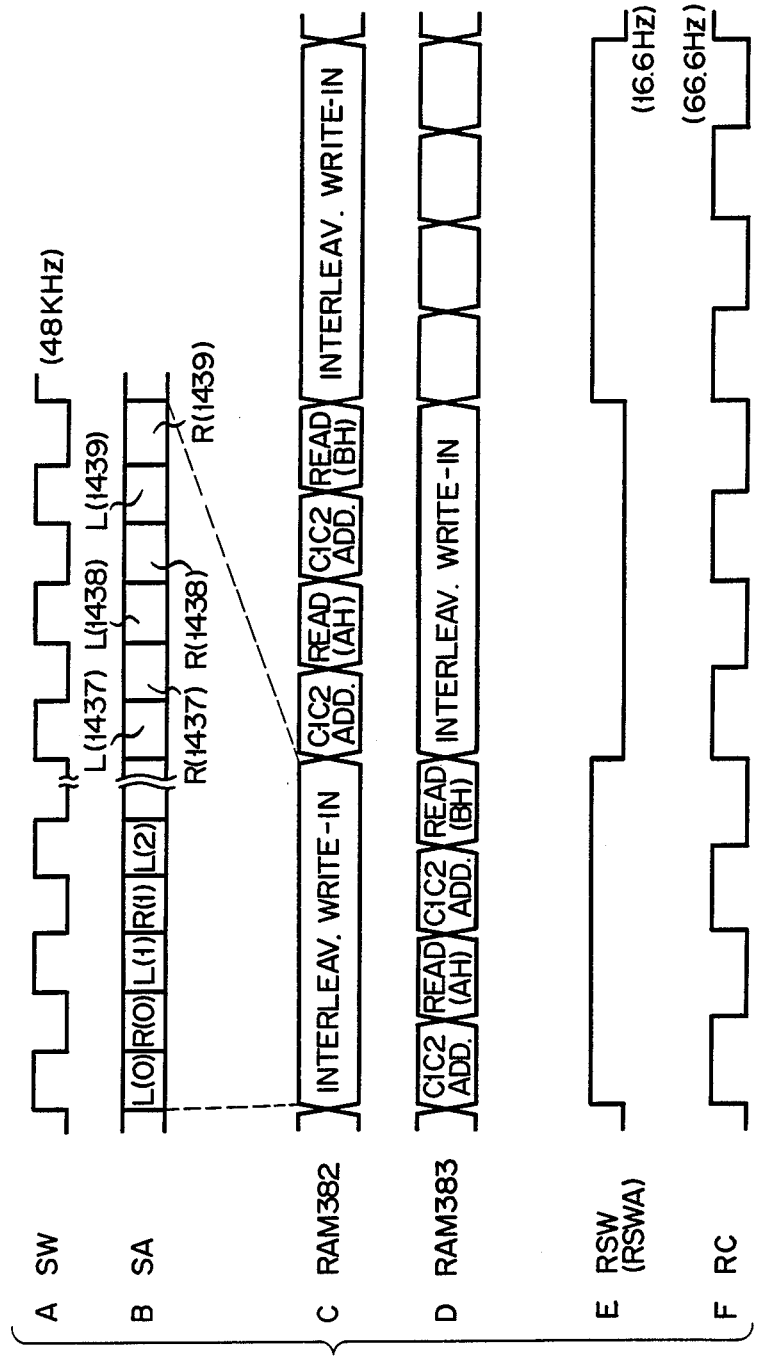
FIGS. 11A to 11F are respectively timing charts for explaining the audio signal record mode in the apparatus of FIG. 2.

Audio signal recording will be described below. Audio signal format converter 37 receives signal SL (audio signal of channel L) from input terminal 24a and signal SR (audio signal of channel R) from input terminal 24b from among DAT external line input terminals 24. Converter 37 amplifies signals SL and SR and changes their signal formats in response to clock pulses CK from clock generator 33, and supplies 16-bit PCM audio signals (signal SA), signal RWA (RAM write control signal for audio signal), and signal RSWA (RAM designation switching control signal for audio signal) to system 38. Among these signals, signal RSWA is a 16.6-Hz rectangular wave signal, as shown in FIGS. 11E and 13A. The 16.6-Hz rectangular wave signal is also supplied to reconverter 40. Signals SA, RWA, and RSWA are selectively supplied to system 38 through switch circuits 41a, 41b, and 41c, respectively. System 38 includes RAMs (to be described in detail later) and records data sent from converter 36 or 37.

Figure 16:
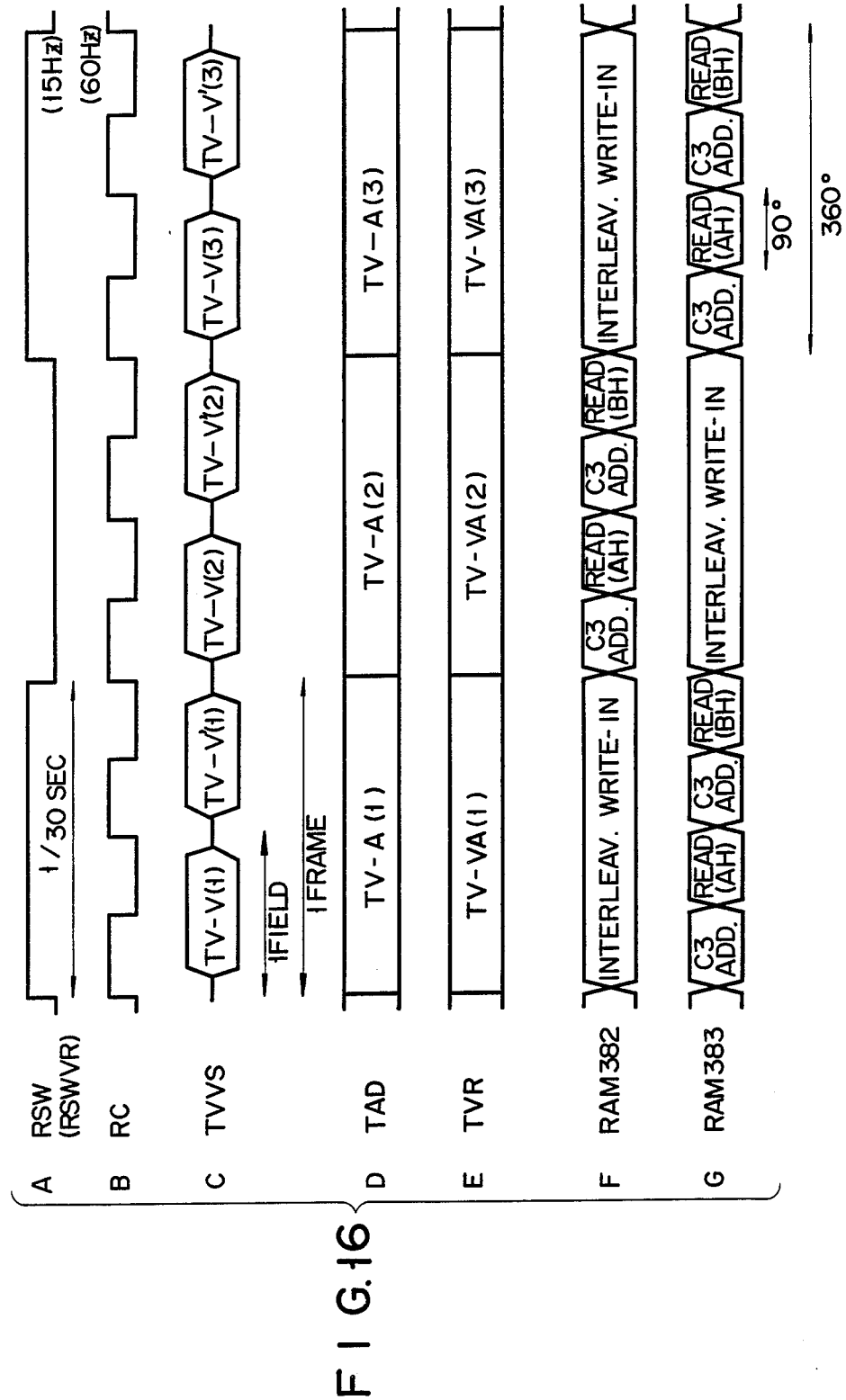
FIGS. 16A to 16G are respectively timing charts for explaining the operation in the TV signal record mode.
Figure 17:
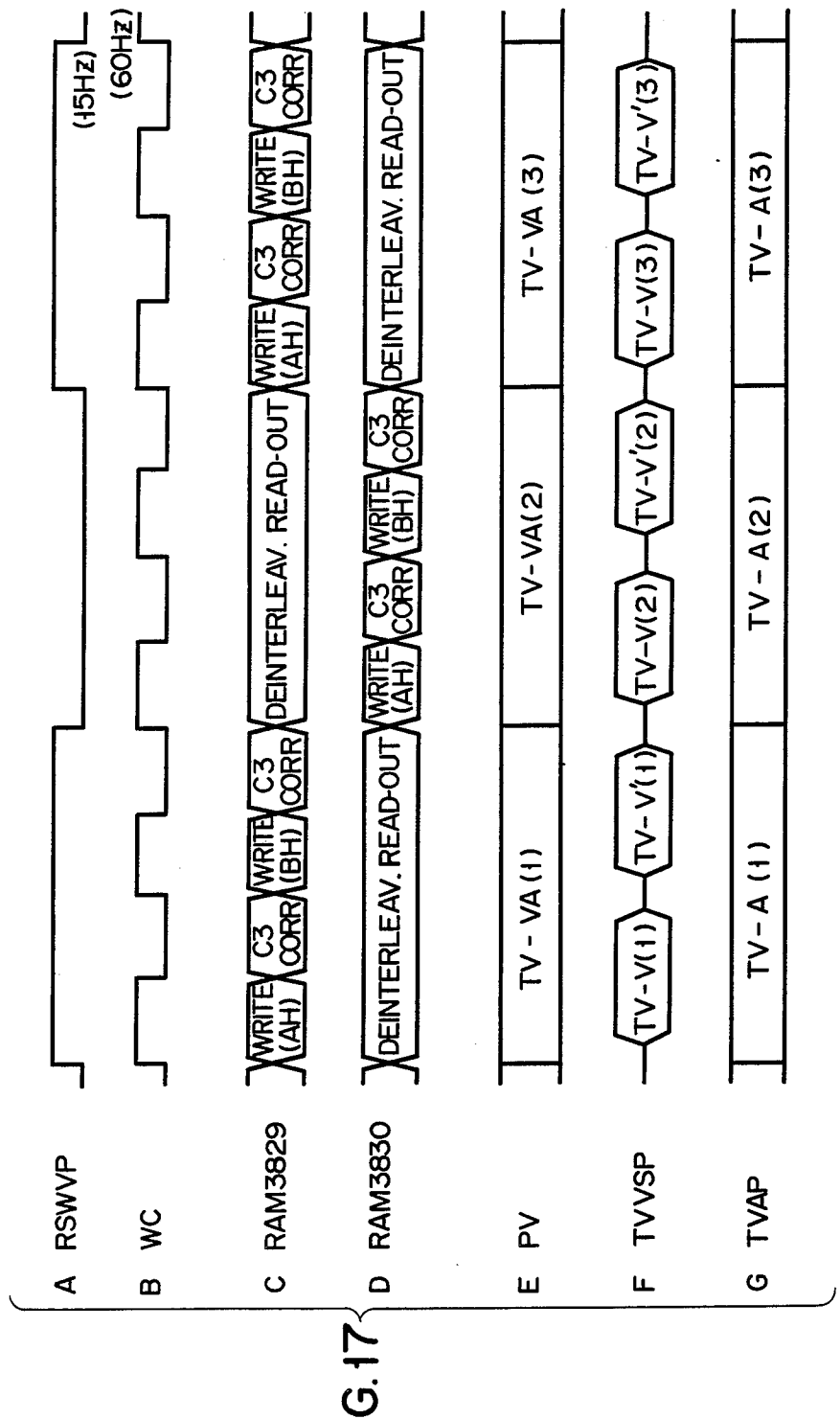
FIGS. 17A to 17G are respectively timing charts for explaining the operation in the TV signal playback mode.

TV signal playback will be described below. TV signal format reconverter 39 supplies signal RSWVP (RAM designation switching control signal for TV signal in playback) and signal RRV (RAM read control signal for TV signal) to system 38. Signal RSWVP from reconverter 39 is selected by switch circuit 45 and switch circuit 41c, and is then supplied to system 38. Signal RRV is supplied to system 38 through switch circuit 41e. Signals RSWVR and RSWVP are 15-Hz rectangular wave signals, as shown in FIGS. 15A, 16A, and 17A. The half cycle of each 15-Hz signal is 1/30 second.

Data read out from a RAM in system 38 is selected by switch circuit 41d, and is supplied as signal PV (playback TV signal) to reconverter 39. Reconverter 39 reconverts signal PV to a signal of the TV signal format prior to recording, and outputs signals TVAP (TV audio playback signals), signal TVVSP (TV video playback sampling signal), and sync signal TVSYNCP. Signals TVVSP and TVSYNCP from reconverter 39 are supplied to display driver 35 through switch circuits 34b and 34c, respectively. Signal TVAP is input to the selected contact of one of switch circuits 42a and 42b through switch circuit 34a. The recorded television signal is thus played back.

Audio signal playback will now be described. Signal RRA (RAM read control signal for audio signal) output from audio format reconverter 40 is supplied to record/playback system 38 through switch circuit 41e. The playback audio signal from system 38 is selected by switch circuit 41d and is supplied as signal PA (playback audio signal) to reconverter 40. Each of audio signals SLP and SRP reconverted by reconverter 40 is supplied to the other contact of a corresponding one of switch circuits 42a and 42b. Signals SLP and SRP are selected by switch circuits 42a and 42b and supplied to speakers 15a and 15b through amplifiers 43a and 43b, respectively.

The respective blocks in FIG. 2 will be described in detail.

Figure 3:
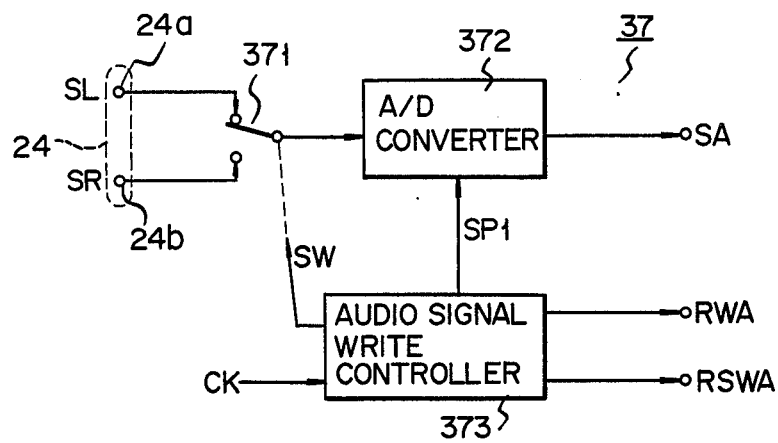
FIG. 3 is a detailed block diagram of an audio signal format converter shown in FIG. 2.

Audio signal format converter 37 will be described in detail with reference to FIG. 3. Format converter 37 comprises DAT external line input terminal 24, switch circuit 371, A/D converter 372, and audio signal write controller 373. Terminal 24 consists of input terminal 24a for receiving signal SL and input terminal 24b for receiving signal SR. Signals SL and SR are alternately selected by switch circuit 371 and are supplied to A/D converter 372. Controller 373 generates 48-kHz signal SW (switching signal) shown in FIG. 11A, 48-kHz sampling pulse signal SP1, and signals RSWA and RWA, in response to master clock pulses CK supplied from generator 33. Switch circuit 371 is switched in response to signal SW, and selectively outputs signals SL and SR to A/D converter 372. Converter 372 A/D-converts signal SL or SR in response to signal SP1, and outputs sampled digital signal SA. Signal SA is a signal of one word consisting of 16 bits. L-channel signals L(0), L(1), ... and R-channel signals R(0), R(1), ... are alternately output, i.e., L(0), R(0), L(1), R(1), ... are output in the order.

Figure 4:
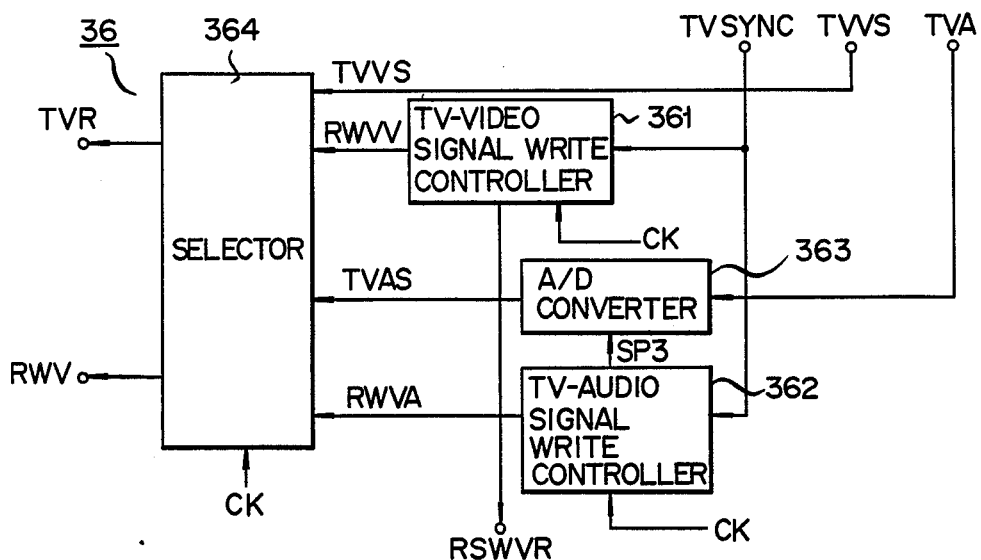
FIG. 4 is a detailed block diagram of a TV signal format converter shown in FIG. 2.

The detailed circuit arrangement of TV signal format converter 36 in FIG. 2 will be described in detail with reference to FIG. 4. As shown in FIG. 4, converter 36 comprises TV video signal write controller 361, TV audio signal write controller 362, A/D converter 363 and selector 364. Controller 361 generates signals RWVV (RAM write control signal for TV video signal) and RSWVR in response to signals TVSYNC and master clock pulses CK from generator 33. Signal RWVV is supplied to selector 364. Signal RWVV consists of television signal write address signal RWVV-1 and timing control signal RWVV-2, as shown in FIGS. 15E and 15F. Controller 362 generates sampling clocks SP3 and signal RWVA (RAM write control signal for TV audio signal) in response to signals TVSYNC and master clocks CK. Clocks SP3 are supplied to A/D converter 363 and signal RWVA is supplied to selector 364. Signal RWVA consists of TV audio signal write address signal RWVA-1 and timing control signal RWVA-2, as shown in FIGS. 15H and 15I. Converter 363 receives signal TVA and samples and converts signal TVA into signal TVAS in response to signal SP3. Signal TVAS is supplied to selector 364. Selector 364 selects each input signal in response to clocks CK and outputs signals TVR and RWV. The arrangement of selector 364 is shown in FIG. 5.

Referring to FIG. 5, selector 364 comprises D flip-flops (F/Fs) 3615 to 3617 and 3622 to 3624, AND gates 3619 and 3621, inverter 3618, OR gate 3620, and 3-state buffers 3611 to 3614. Signals TVVS, RWVV-1, TVAS, and RWVA-1 are respectively supplied to buffers 3611, 3612, 3613, and 3614. Signal RWVV-2 in signal RWVV is input to the clock terminal of F/F 3615. A "1" signal is always input to terminal D of F/F 3615 and output signal a (FIG. 15K) from terminal Q thereof appears at terminal D of F/F 3616. F/F 3616 receives an input signal in response to clock CK1. Q terminal output signal b (FIG. 15L) from F/F 3616 is supplied as a gate signal to buffers 3611 and 3612. This Q output is also supplied to terminal D of F/F 3617. F/F 3617 receives the input signal in response to clock CK1, and an output signal therefrom appears at clear terminal C of F/F 3615. An output signal from F/F 3616 is supplied to AND gate 3619 through inverter 3618, and to AND gate 3621 through OR gate 3620.

Signal RWVA-2 of signal RWVA is supplied to the clock terminal of F/F 3622. A "1" signal is always supplied to terminal D of F/F 3622. Q terminal output signal c (FIG. 15M) from F/F 3622 appears at terminal D of F/F 3623. F/F 3623 receives an input signal in response to clock CK1 and a Q output signal therefrom is supplied to AND gate 3619. AND gate 3619 also receives an inverted signal of Q output signal from F/F 3616 through inverter 3618. Output signal d in FIG. 15N is supplied to terminal D of F/F 3624. F/F 3624 receives an input signal in response to clock CK1 and an output signal therefrom is supplied to clear terminal C of F/F 3622. Signal d from AND gate 3619 is supplied as a gate signal to buffers 3613 and 3614. Signal d is also supplied to AND gate 3621 through OR gate 3620. AND gate 3621 receives clock CK1 and its output signal is output as signal RWV-2. Outputs from buffers 3611 and 3612 are combined and the composite signal is output as signal TVR. Output signals from buffers 3612 and 3614 are combined and the composite signal is output as signal RWV-1. Signals RWV-1 and RWV-2 are selectively supplied to system 38 as signal RWV through switch circuit 41b.

The detailed arrangement of record/playback system 38 in FIG. 2 is shown in FIG. 6. The PCM signal (i.e., signal TVR or SA) externally supplied to recording data input terminal RECIN is selectively input to first and second RAMs 382 and 383 through switch circuit 381. RAMs 382 and 383 are used as delay buffers for performing interleaving scanning, redundant addition, and tape write operation. Signal RW (i.e., signal RWA or RWV) externally supplied to the RW terminal of system 38 is selectively supplied to RAMs 382 and 383 through switch circuit 384. Switch circuits 381 and 384 are controlled by signal RSW (i.e., signal RSWA or RSWVR) input from converters 36 and 37 through switch circuit 41c, and are alternately switched between RAMs 382 and 383.

Signal RSW is supplied to timing pulse generator 385. Generator 385 generates signal DR (RAM data read control signal) and timing clock signal RC (read control signal) in response to signal RSW, and supplies signal DR to RAMs 382 and 383 through switch circuit 386, which is controlled by signal RSW. As shown in FIGS. 11F and 16B, signal RC has a frequency of 66.6 Hz in the PCM audio signal record/playback mode, and a frequency of 60 Hz in the TV signal record/playback mode.

Data read out from RAMs 382 and 383 is selectively extracted by switch circuit 387 controlled by signal RSW, and is output to switch circuit 388. Switch circuit 388 is controlled by signal RC from timing generator 385. The read data signals from RAMs 382 and 383 through switch 387 are selectively output to C1, C2 parity data generation/addition circuit 389 and C3 parity data generation/addition circuit 3810, or to modulator 3811 through switch 387. As shown in FIG. 12A, generation/addition circuit 389 adds horizontal parity C2 of 24 blocks to each 104-block PCM signal from each of RAMs 382 and 383, a total of horizontal parity of 48 blocks, and adds vertical parity C1 of 32 bits to each 104-block PCM signal and each horizontal parity C2. Generation/addition circuit 3810 adds, e.g., 8-bit vertical parity C3 to each TV signal written in RAMs 382 and 383, as shown in FIG. 12B.

Output signals from generation/addition circuits 389 and 3810 are selected by switch circuit 3812, controlled in response to audio/video switching signal A/V from mode switch 23. The signal selected by switch circuit 3812 is selectively supplied to RAM 382 or 383 through switch circuit 3813, controlled in response to signal RC from timing generator 385, and through switch circuit 3814 controlled in response to signal RSW.

Figure 7A:
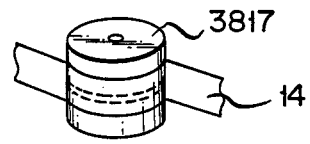
FIG. 7A is a perspective view showing the structure of a rotary head.
Figure 7B:
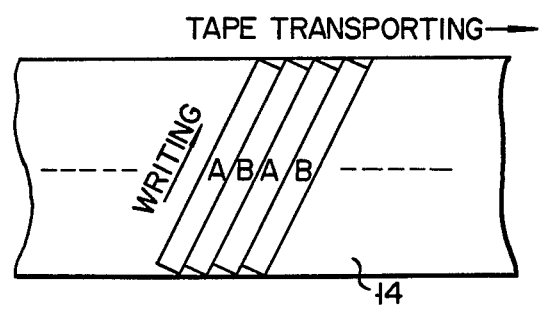
FIG. 7B is a plan view showing a recorded pattern on a magnetic tape.

Modulator 3811 converts the input signal to a signal having a spectrum suitable for magnetic recording according to the NRZI scheme. The converted signal is output to record/playback head 3816 through amplifier 3815. Head unit 3816 comprises two heads AH and BH which are mounted on rotary drum 3817, spaced apart by an angular interval of 180 degrees, as shown in FIG. 7A. Drum 3817 is driven at a predetermined speed by motor 3819 controlled by drum motor controller 3818. Controller 3818 controls drum motor 3819 in response to signal RSW and signal R/P enabled in the record/playback mode. In the record/playback mode of the PCM audio signal, drum 3819 is rotated at 2,000 rpm. However, in the record/playback mode of the TV signal, drum 3819 is rotated at 1,800 rpm. DAT tape 14 is obliquely wound around drum 3817 at an inclination angle of 90 degrees, and is driven at normal speed. Therefore, as shown in FIG. 7B, recording tracks A and B are alternately formed on DAT tape 14 at a predetermined inclination angle. Tracks A and B respectively correspond to record/playback heads AH and BH.

Timing pulse generator 3827 generates signal DW (RAM data write control signal), and signal WC (write control signal) (FIGS. 13B and 17B) having the same frequency as that of timing signal RC, in response to signal RSW.

Data read out from DAT tape 14 by head unit 3816 is amplified by amplifier 3821, and is demodulated by demodulator 3822. Data demodulated by demodulator 3822 is supplied to one selection terminal of switch circuit 3823. The output from either C1, C2 error correction circuit 3824 or C3 error correction circuit 3825 through switch circuit 3826 is supplied to the other selection terminal of switch circuit 3823. Switch circuit 3826 is controlled in response to audio/video switching signal A/V. Switch circuit 3823 is controlled in response to timing signal WC from generator 3827, and selects the demodulated signal from demodulator 3822 or the signal supplied from correction circuit 3824 or 3825 through switch circuit 3826. The signals selected by switch circuit 3823 are selectively supplied to RAMs 3829 and 3830 through switch circuit 3828. Switch circuit 3828 is controlled in response to signal RSW.

Signal DW is supplied to third RAM 3829 and fourth RAM 3830 through switch circuit 3831, which is switched in response to signal RSW. External signal RR (RAM read control signal), i.e., signal RRA or RRV is supplied to RAMs 3829 and 3830 through switch circuit 3832, which is switched in response to signal RSW. Data signals read out from RAMs 3829 and 3830 are selectively extracted through switch circuit 3833 controlled in response to signal RSW. The selected data is supplied to correction circuits 3824 and 3825 through switch circuit 3834, which is on/off controlled in response to signal WC. Data signals from RAMs 3829 and 3830 are supplied as playback output PLAYOUT through switch circuit 3835, which is switched in response to signal RSW. RAMs 382, 383, 3829 and 3830 can be replaced by one RAM if an appropriate switch is used.

Figure 8:
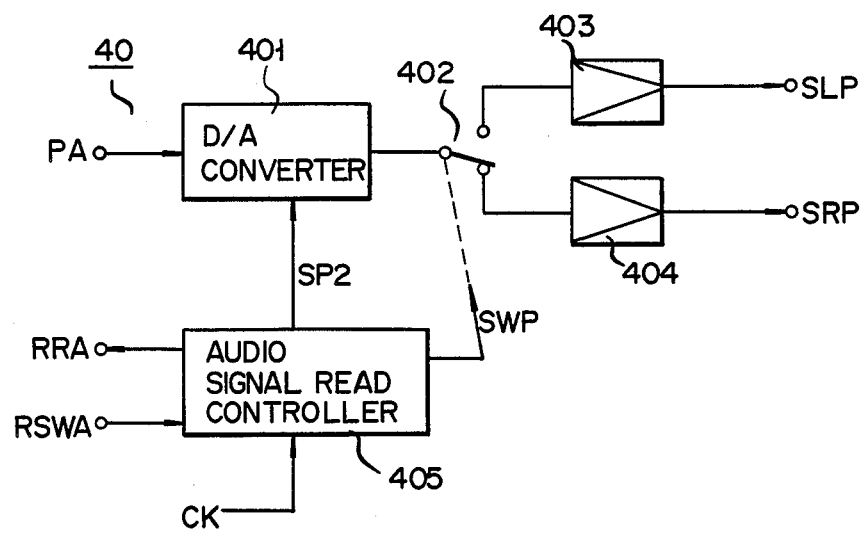
FIG. 8 is a detailed block diagram of an audio signal format reconverter shown in FIG. 2.

FIG. 8 shows the arrangement of audio signal format reconverter 40. Reconverter 40 comprises D/A converter 401, audio signal read controller 405, switch circuit 402, and amplifiers 403 and 404. Controller 405 outputs signal RRA in response to master clock pulse CK from generator 33 and signal RSWA from audio signal format converter 37. Controller 405 also supplies sampling pulse SP2 to D/A converter 401 and signal SWP to switch circuit 402. Converter 401 converts signal PA, received from system 38 through switch circuit 41d, to an analog signal in response to sampling pulse SP2, and selectively supplies the sampled signal to amplifiers 403 and 404. Switch circuit 402 is switched to output the L-channel audio signal to amplifier 403 and the R-channel audio signal to amplifier 404 in response to signal SWP. Outputs from amplifiers 403 and 404 are respectively L- and R-channel playback audio signals SLP and SRP.

FIG. 9 shows the detailed arrangement of TV signal format reconverter 39. Reconverter 39 comprises separator 391, latches 392 and 393, TV video signal read controller 394, TV audio signal read controller 395, and D/A converter 396. Separator 391 receives signal PV in response to clock CK, and separates signal PV into signal PVV (playback TV video signal) and signal PVA (playback TV audio signal). Separator 391 receives signals RRVV (RAM read control signal for TV video signal) and signal RRVA (RAM read control signal for TV audio signal) and combines them to produce signal RRV. Controller 394 outputs signals RRVV, RSWVP, TVSYNCP, and CK2 in response to master clock CK from generator 33. Signal RRVV consists of RAM read address signal RRVV-1 and timing signal RRVV-2. Latch 392 latches signal PVV from separator 391 in response to signal CK2, and outputs it as signal TVVSP. Controller 395 generates signal RRVA, sampling pulse SP4, and clock CK3 in response to master clock CK and signals TVSYNCP from controller 394. Signal RRVA consists of RAM read address signal RRVA-1 and timing signal RRVV-2. Latch 393 latches signal PVA from separator 391 in response to clock CK3, and outputs it to D/A converter 396. Converter 396 converts the signal from latch 393 to analog signal TVAP in response to sampling pulse SP4, and outputs signal TVAP.

Figure 10:
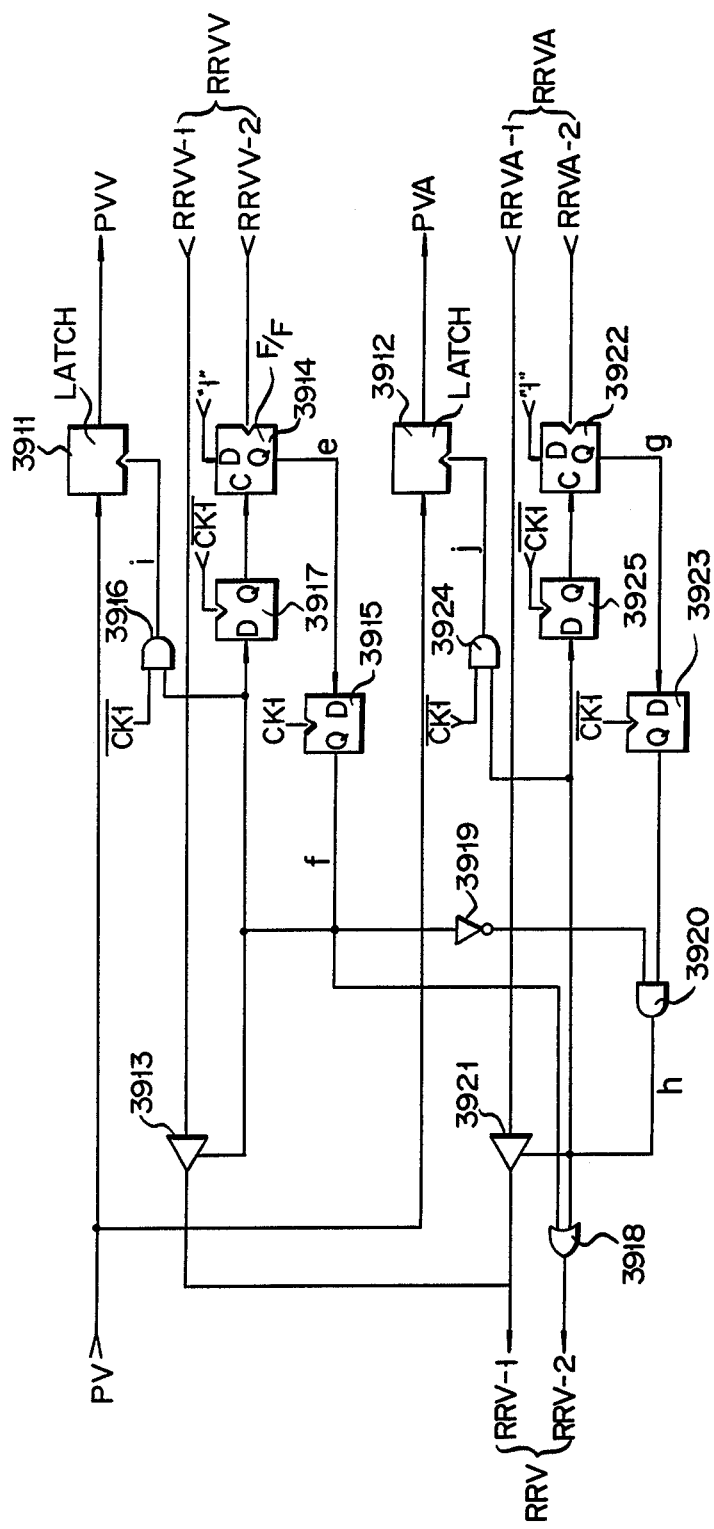
FIG. 10 is a detailed block diagram of a separator shown in FIG. 9.
Figure 18:
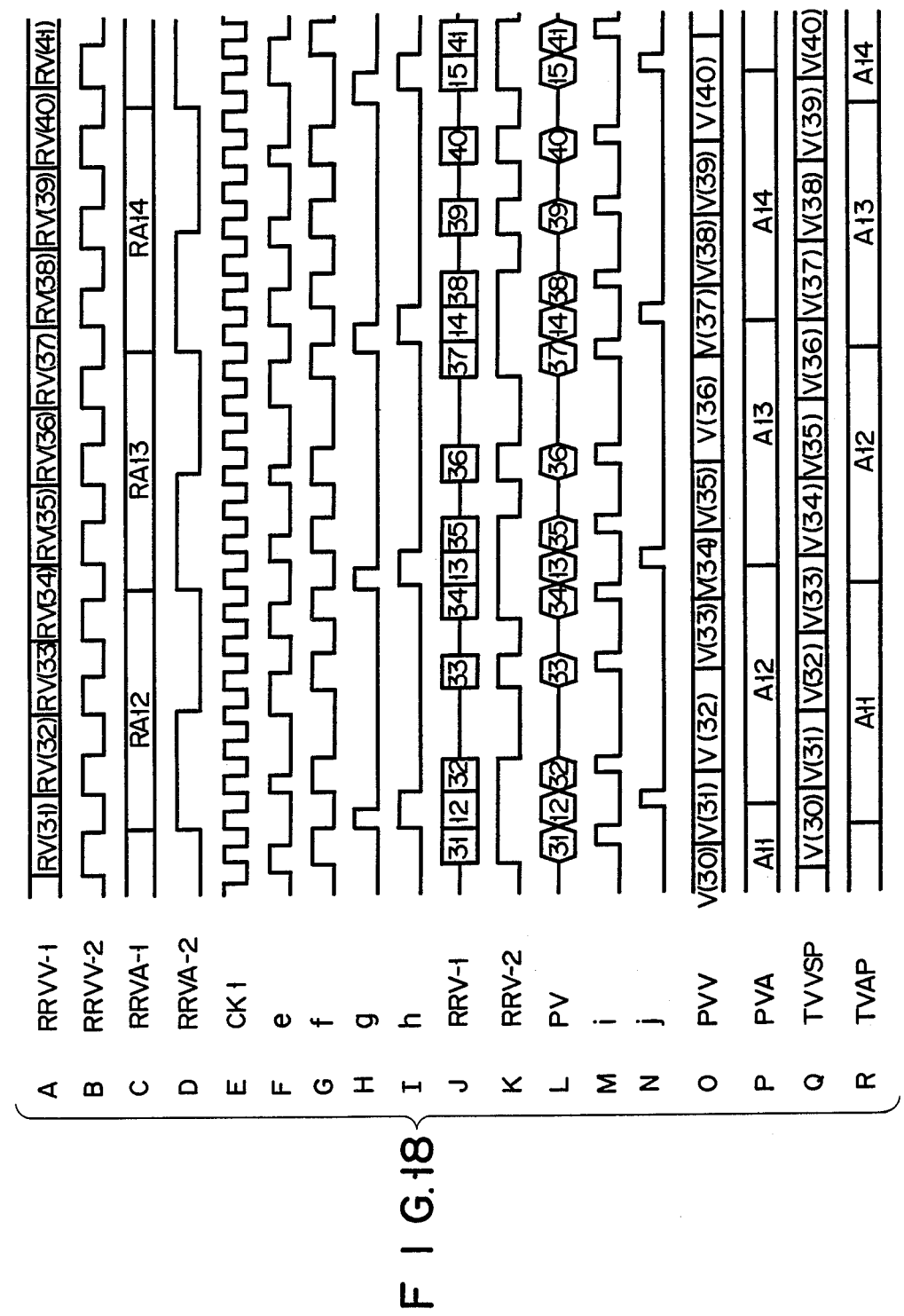
FIGS. 18A to 18R are respectively timing charts for explaining the operation of the TV signal format reconverter.

The detailed arrangement of separator 391 will be described in detail with reference to FIG. 10. Separator 391 comprises latches 3911 and 3912, flip-flops (F/F) 3914, 3915, 3917, 3922, 3923, and 3925, buffers 3913 and 3921, AND gates 3916, 3924, and 3920, OR gate 3918, and inverter 3919. Signal PVV of signal PV from system 38 is latched by latch 3911 in response to signal i. Signal PVA of signal PV is latched by latch 3912. The latched data signals are supplied to latches 392 and 393 in FIG. 9. Signal RRVV-1 of signal RRVV is in-put to 3-state buffer 3913 and signal RRVV-1 of signal RRVV is input to D F/F 3914. More specifically, Q output signal in FIG. 18F is supplied to terminal D of F/F 3915. F/F 3915 receives the input signal in response to clock pulse CK1, and outputs Q output signal f (FIG. 18G) to the gate terminal of buffer 3913, to AND gate 3916, and to terminal D of F/F 3917. AND gate 3916 receives clock pulse and supplies output signal i (FIG. 18M) to the clock terminal of latch 3911. Signal PV is then latched to obtain signal PVV. F/F 3917 receives the input signal in response to clock pulse $\overline{CK1}$ supplied to its clock terminal, and outputs the Q output signal to clear terminal C of F/F 3914. Output signal f from F/F 3915 is also supplied to OR gate 3918 and to AND gate 3920 through inverter 3919.

Signal RRVA-1 of signal RRVA supplied from controller 395 is input to buffer 3921, and signal RRVA-2 thereof is input to the clock terminal of F/F 3922. A "1" signal is always supplied to terminal D of F/F 3922 which outputs Q output signal (FIG. 18H) to terminal D of F/F 3923. F/F 3923 receives the input signal in response to clock pulse CK1, and supplies its Q output sighal to AND gate 3920. Output signal h (FIG. 18I) from AND gate 3920 is supplied to the gate terminal of buffer 3921 and to OR gate 3918, AND gate 3924, and terminal D of F/F 3925. Clock pulse $\overline{CK1}$ is input to AND gate 3924 and output signal nal j in FIG. 18N is output to the clock terminal of latch 3912. Signal PV is latched by latch 3912 in response to to obtain signal PVA. F/F 3925 receives the insignal put signal in response to clock pulse CK1 and outputs the Q output signal to the clear terminal of F/F 3922. Output signals from buffers 3913 and 3921 are combined, and the composite signal serves as signal RRV-1 of signal RRV. The output from OR gate 3918 serves as signal RRV-2.

The operation of the above embodiment will be described below.

The external audio signal record mode will be first described. In order to record an audio signal, TV band switch 22 in FIG. 1 is turned OFF, mode switch 23 is set in the audio mode A position, and an audio signal (stereo) is input to DAT external line input terminal 24. Upon setting of mode switch 23 to the audio mode, i.e., the A position, switch circuits 41a to 41c in FIG. 2 are switched to the audio signal format converter 37 side, switch circuits 41d and 41e are switched to the audio signal format reconverter 40 side, and switch circuits 42a and 42b are switched to the reconverter 40 side. In this state, DAT tape cassette 13 is loaded in DAT cassette holder 12, and REC and PLAY keys among DAT tape drive control switches 18 are simultaneously depressed to start recording. The audio signal, consisting of L-channel audio signal SL and R-channel audio signal SR and supplied to terminal 24, is supplied to converter 37 in FIG. 2. Converter 37 causes switch circuit 371 to alternately select external input audio signals SL and SR. The selected signal is supplied to A/D converter 372, as shown in FIG. 3. Switch circuit 371 is switched in response to signal SW output from controller 373. As shown in FIG. 11A, signal SW has the same frequency (e.g., 48 kHz) as that of sampling pulse SP1 for A/D converter 372. Signal SW is a rectangular wave signal with 50% duty. As shown in FIG. 11B, switch circuit 371 selects signal SL when signal SW is set at high level. Otherwise, switch circuit 371 selects signal SR.

A/D converter 372 samples the audio signal in response to 48-kHz sampling pulse SP1, and converts it to the PCM audio signal (16 bits/word). FIG. 11B shows output signal SA from converter 372. L(1), L(2), L(3), . . . represent one word of the L-channel PCM audio signal and R(0), R(1), R(2), . . . represent one word of the R-channel PCM audio signal. Signal SA from converter 372 is supplied to system 38 through switch circuit 41a in FIG. 2. In addition, signals RWA and RSWA are output from converter 37 in response to signal SW. Signal RWA is supplied to system 38 through switch circuit 41b and signal RSWA is supplied thereto through switch circuit 41c.

Upon reception of signals SA and RSWA from converter 37, system 38 switches switch circuits 381 and 384 in response to signal RSWA as signal RSW, and signal SA is alternately written in RAMs 382 and 383. As shown in Figs. 11C and 11D, at the "L" timing of signal RSWA, signal SA is written in RAM 383, but at the "H" timing thereof, signal SA is written in RAM 382. If signal RSW is set at L level, data stored in RAM 382 is written on DAT tape 14. However, if signal RSW is set at H level, data stored in RAM 383 is written on DAT tape 14. RAMs 382 and 383 have a total capacity of $$256 \text{ (bits)} \times 256 \text{ (blocks)} = 65{,}536 \text{ (bits)}$$

as shown in FIG. 12A. At the H/L timings of signal RSWA, rotary drum 3817 is rotated for the audio signal at 2,000 rpm. The on/off period is 60/2,000 sec, and the number of sampled audio pulses in this timing is 48 kHz×(60/2,000)×2 (CH)=2882 (words), i.e., 2,880×16=46,080 (bits). As shown in FIG. 11B, the total number of sampled audio pulses included in the above timing is a total of 2,880 words consisting of 1,440 words from L-channel PCM audio signals L(0) to L(1439) and 1,440 words from R-channel PCM audio signals R(0) to R(1439). Since one word consists of 16 bits, 2,880 words are equal to 46,080 bits.

Generator 385 in FIG. 6 generates signal DR in response to signal RSWA and supplies it to RAMs 382 and 383 through switch circuit 386. In this case, switch circuit 386 is switched by signal RSWA to selectively supply signal DR to RAM 382 or 383. However, more specifically, switch circuit 386 is switched and connected to the RAM not currently connected to switch circuits 381 and 384. At the L timing of signal RSWA, signal SA is read out from RAM 382. However, at the H timing of signal RSWA, signal SA is read out from RAM 383. Signal SA read out from RAM 382 or 383 is selected by switch circuit 387, and is supplied to modulator 3811 or generation/addition circuit 3810 through switch circuit 388, controlled in response to timing signal RC in FIG. 11F. In this case, signal RC has a frequency of 66.6 Hz, which is four times that of signal RSWA. As shown in FIG. 11E, at the H timing of signal RSWA, the signal read out from RAM 383 is written through switch circuit 388 in generation/addition circuit 389, as shown in FIG. 11D, upon rising of signal RC (FIG. 11F) from generator 385. As shown in FIG. 12A, the C2 parity (horizontal parity) of 24 blocks is added to the 104-block audio signal in generation/addition circuit 389. At the same time, the C1 parity (vertical parity) of 32 bits is added to the 224-bit audio signal and horizontal parity. If audio mode A is set by mode switch 23, switch circuit 3812 is switched to the generation/addition circuit 389 side in response to mode signal A/V. The PCM signal with the C1 and C2 parity is then selected and written in RAM 383 through switch circuits 3813 and 3814 again. When signal RC goes low, switch circuit 388 is switched to the modulator 3811 side, and the signal read out from RAM 383 is supplied to the modulator 3811 through switch circuit 388. The PCM audio signal with the C1 and C2 parity is converted by modulator 3811 into a signal having a spectrum suitable for magnetic recording. The converted signal is output to record/playback head unit 3816 through amplifier 3815, and is recorded by head AH in the A channel of DAT tape 14. In this case, if signal RSWA has a frequency of 16.6 Hz, drum motor controller 3818 controls rotation of drum 3817 through motor 3819 such that drum 3817 is rotated at 2,000 rpm and such that heads AH and BH are sequentially brought into contact with tape 14 at L timings of signal RC, as shown in FIG. 11F. If signal RC goes high again, switch circuit 388 is switched to the generator 389 side, and signal SA read out from RAM 383 is sent to generation/addition circuit 389. The C1, C2 parity is added to signal SA in the same manner as described above. Signal SA with the C1 and C2 parity is stored in RAM 383 again. When signal RC goes low, switch circuit 388 is switched to the modulator 3811 side, and the signal from RAM 383 is supplied to and modulated by modulator 3811. The signal modulated by modulator 3811 is then supplied to head unit 3816 through amplifier 3815, and recorded in the B channel of tape 14 by head BH.

While read operation and parity addition for RAM 383 are performed, interleaving writing of signal SA is performed in RAM 382. When signal RSWA goes low, signal (SA) readout and C1 and C2 parity addition for data in RAM 382 are performed.

Signal SA and the C1 and C2 parity have the following relationship. As shown in FIG. 12A, the audio signal area in RAMs 382 and 383 is given as follows:

$$224 \text{ (bits)} \times 104 \text{ (blocks)} \times 2 = 46{,}592 \text{ (bits)}$$

The audio signal of 46,080 bits is written in this audio area. Therefore, an empty space of 512 bits is available in the audio area. The parity C2 added to the PCM audio signal is:

$$224 \text{ (bits)} \times 48 \text{ (blocks)} = 10{,}752 \text{ (bits)}$$

The parity C1 added to signal SA and parity C2 is:

$$32 \text{ (bits)} \times 256 \text{ (blocks)} = 8192 \text{ (bits)}$$

In order to play back the PCM audio signal recorded on DAT tape 14, TV band switch 22 is turned OFF and mode switch 23 is set in the audio mode A position. The PLAY key of switches 18 is depressed. The data recorded on tape 14 is read out by head unit 3816, and is supplied to demodulator 3822 through amplifier 3821. Demodulator 3822 demodulates the playback signal which is then supplied to RAM 3829 or 3830 through switch circuits 3823 and 3828. In this case, generator 3827 generates signal DW derived from signal RSWA from converter 37. Signal DW is alternately output to RAMs 3829 and 3830 through switch circuit 3831. Generator 3827 also generates 66.6-Hz timing signal WC in FIG. 13B to control the alternate switching states of switch circuit 3823. In a state where switch circuits 3828 and 3833 are switched to the RAM 3829 side by the H level of signal RSWA, as shown in FIG. 13A, assume that signal WC goes high, as shown in FIG. 13B. Switch circuit 3834 is turned off in this state. A PCM audio signal is read out by head AH, and is written in RAM 3829, as shown in FIG. 13C. In the playback mode, controller 3818 controls rotation of drum 3816 such that heads AH and BH are sequentially brought into contact with DAT tape 14 at H timings of signal WC. Upon inversion of the level of signal RSWA, the PCM audio signal is read out by head AH. When signal WC goes low, switch circuit 3823 is switched to the switch circuit 3826 side, and switch circuit 3834 is closed. In audio mode A, switch circuit 3826 is switched to the correction circuit 3824 side. For this reason, the PCM audio signal written in RAM 3829 is read out to C1 and C2 parity correction circuit 3824. Error data is detected according to the C1 and C2 parity data, and the storage data in RAM 3829 is corrected. When signal WC goes high, the PCM audio signal read out by head BH and demodulated by demodulator 3822 is written in RAM 3829 in the same manner as described above. In this manner, the PCM audio signal written in RAM 3829 is corrected by correction circuit 3824 when signal WC goes low.

When writing and error correction of the PCM audio signal in RAM 3829 is completed and signal RSWA goes low, PCM audio signal writing and error correction for RAM 3830 is performed, as shown in FIG. 13D, in the same manner as for RAM 3829.

The PCM audio signals written in RAMs 3829 and 3830 are read out in response to signal RRA, as signal RR, from reconverter 40 and are alternately selected by switch circuit 3835. Switch circuit 3835 is switched to the RAM 3830 side when signal RSWA is set at H level. However, when signal RSWA is set at L level, switch circuit 3835 is switched to the RAM 3829 side. Therefore, PCM audio signals are read out from the RAM currently free from write access. In this case, addressing of RAMs 3829 and 3830 in the playback mode allows deinterleaving of data words interleaved and distributed within one segment in the recording mode, as shown in FIG. 13E. The readout data is restored to the original sequence. The PCM audio signals alternately read out from RAMs 3829 and 3830 serve as playback signals PA and signals PA are supplied by system 38 to reconverter 40 through switch circuit 41d.

As shown in FIG. 8, in reconverter 40, controller 405 generates signal RRA in response to signal RSWA and clock pulse CK, and supplies it to system 38. PCM audio signal PA is read out from system 38 in response to signal RRA, and is supplied to D/A converter 401 in reconverter 40. Converter 401 converts signal PA to an analog signal in response to sampling pulse SP2. Switch circuit 402 is switched by signal SWP, having the same frequency (i.e., 48 kHz) as that of signal SW (i.e., the switching signal for data write), supplied from controller 405, and alternately supplies the audio signal from converter 401 to amplifiers 403 and 404. The signals amplified by amplifiers 403 and 404 appear from reconverter 40 as L- and R-channel playback audio signals SLP and SRP. Signals SLP and SRP are supplied to amplifiers 43a and 43b to drive speakers 15a and 15b through switch circuits 42a and 42b, respectively.

Figures 13, 14:
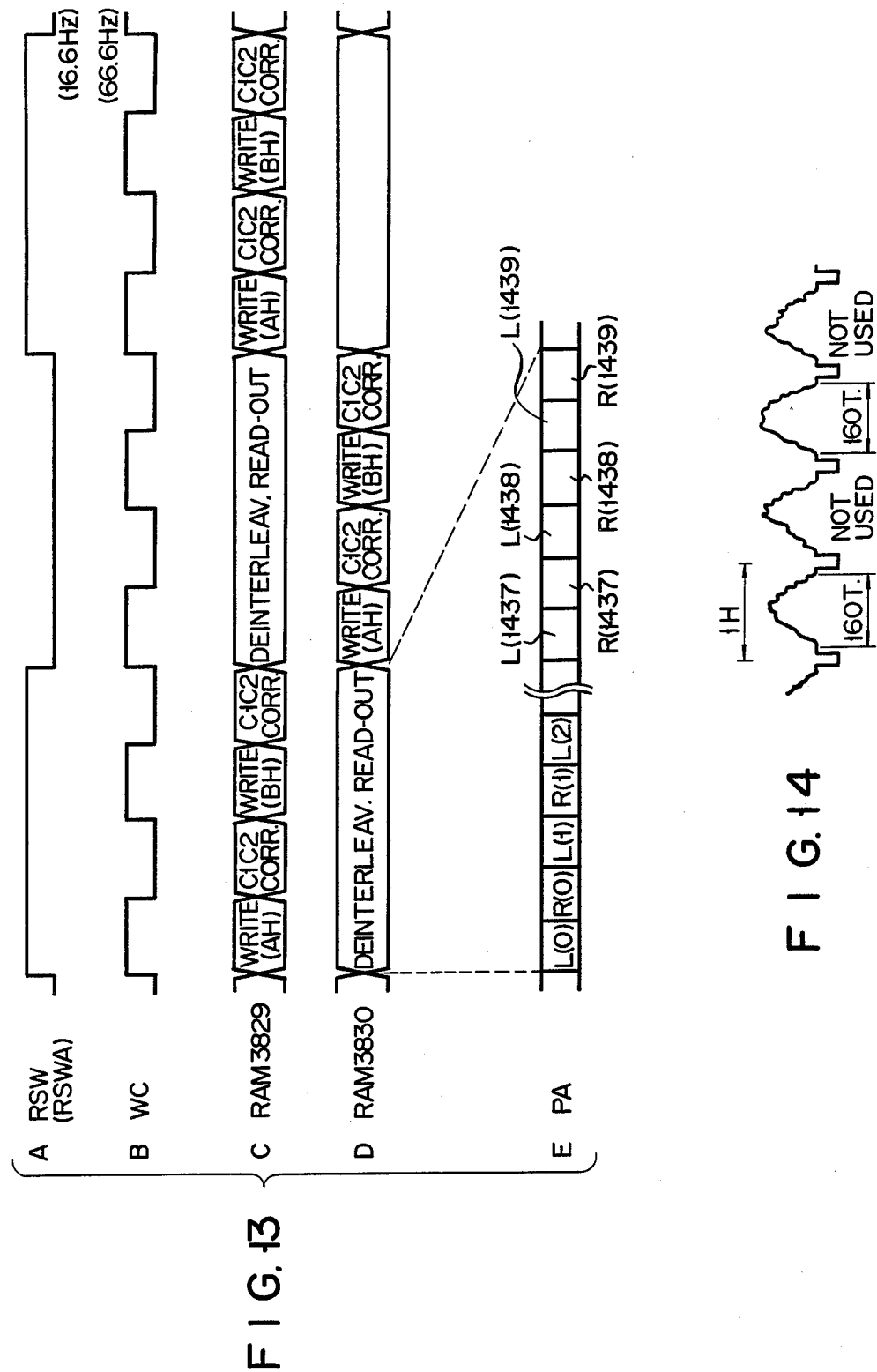
FIG. 14 shows a waveform for explaining TV video signal compression in a TV video signal sampling circuit in FIG. 2.

The operation for receiving a TV radio wave from a television station will be described below. In order to receive the TV radio wave, TV band switch 22 in FIG. 1 is set to the VHF or UHF position, and mode switch 23 is switched to the video mode V position. Upon selection of the VHF or UHF band by switch 22, switch circuits 34a to 34c are switched to the system 31 side. Upon selection of video mode V by mode switch 23, switch circuits 42a and 42b are switched to the switch circuit 34a side. Signal TVV (TV video signal) and signals TVSYNC from system 31 are supplied to sampling circuit 32 and are converted to digital signals. In this case, quantization accompanies data compression. Sampling circuit 32 samples signal TVV from system 31 for every other horizontal scanning line, as shown in FIG. 14. The selected TV signal components are sampled 160 times in response to clock pulses CK from clock generator 33, thereby obtaining a 3-bit digital signal per sampling. The effective scanning lines of one field are compressed to scanning lines suitable for scanning the liquid crystal display panel. The number of bits of the TV sampling signal from sampling circuit 32, i.e., digital video signal TVVS per field is:

$$120 \times 160 \times 3 = 57{,}600 \text{ bits}$$

Signal TVVS compressed by sampling circuit 32 is supplied to liquid display panel driver 35 through switch circuit 34b and is displayed on liquid display panel 11. TV audio signal TVA from system 31 is supplied to amplifiers 43a and 43b through switch circuits 34a, and 42a and 42b to drive speakers 15a and 15b. In this state, upon operation of TV tuning keys 16a and 16b, any television channel can be selected.

In order to record a TV signal of a program tuned by keys 16a and 16b, DTA tape cassette 13 is loaded in DAT cassette holder 12, and the REC and PLAY keys of switches 18 are simultaneously depressed. In order to record a TV signal, signal TVVS from sampling circuit 32 is supplied to converter 36 in response to signals TVA and TVSYNC from system 31, which are then converted to digital signals to be recorded on DAT tape 14. As best shown in FIG. 4, converter 36 supplies signal TVVS to selector 364, signal TVA to A/D converter 363, and signals TVSYNC to controllers 361 and 362. Signal TVVS consists of first field video signal TV-V(1) and second field video signal TV-V'(1), as shown in FIG. 15B. Signal TV-V(1) is sampled 160 times for 1 H (FIG. 14) by sampling pulses of about 2.5 MHz, as shown in FIG. 15D, and is converted to 3-bit data so that there are 120 data signals per 1/30 second at an 1 H interval. The same processing as described above is performed for video signal TV-V'(1). However, signal TV-V'(1) is not used for recording. Controller 361 is operated in response to signals TVSYNC and clock pulses CK, and generates signal RSWVR (FIG. 15A), which is inverted every 1/30 second, i.e., every frame of the video image, and signal RWVV (FIGS. 15E and 15F). Controller 362 is operated in response to signals TVSYNC and clock pulses CK, and supplies signal RWVA (FIGS. 15H and 15I) to selector 364 and 2.4-Hz clock pulse SP3 to A/D converter 363. Converter 363 samples signal TVA 300 times per 1/30 second, and as shown in FIGS. 15C and 15G, and converts it to signal TVAS of 7 bits. Signal TVAS is output to selector 364.

Controller 361 supplies signal RWVV-1 (RV(1) to RV(160)) (FIG. 15E), corresponding to data pulses V(1) to V(160) of signal TVVS shown in FIG. 15D, and timing signal RWVV-2 (FIG. 15F) to selector 364. Controller 362 supplies signal RWVA-1 (RA(1) to RA(800)) (FIG. 15H), corresponding to data pulses A1 to A800 of signal TVAS in FIG. 15G, and timing signal RWVA-2 (FIG. 15I) to selector 364. As best shown in FIG. 5, in selector 364, signal RWVV-1 is input to buffer 3612 and signal RWVV-2 is input to the clock terminal of F/F 3615. A "1" signal is always supplied to terminal D of F/F 3615, and F/F 3615 receives the "1" signal in response to signal RWVV-2. Signal a output from F/F 3615 is set at logic "1", as shown in FIG. 15K. This logic "1" signal is then supplied to next F/F 3616. F/F 3616 receives signal a in response to clock pulse CK1 of about 5 MHz (FIG. 15J), and outputs signal b shown in FIG. 15L. Signal b enables gates of buffer 3611 and 3612 and signal TVVS appears as part of recording data TVR shown in FIG. 15O. At the same time, signal RWVV-1 is output as part of signal RWV-1 (FIG. 15P) from buffer 3612. Signal b from F/F 3616 is input to AND gate 3621 through OR gate 3620. AND gate 3621 also receives clock pulse $\overline{CK1}$. If signal b from F/F 3616 goes to logic "1", signal RWV-2 FIG. 15Q) is output from AND gate 3621 in response to clock pulse $\overline{CK1}$. While signal b from F/F 3616 is set at logic "1" to allow generation of a signal associated with the video signal, the output from inverter 3618 is set at logic "0" to disable AND gate 3619 and inhibit generation of a signal associated with the audio signal. Signal b from F/F 3616 is supplied to F/F 3617 in response to clock pulse $\overline{CK1}$. An output signal from F/F 3617 clears F/F 3615. Signal a from F/F 3615 is set at logic "0". The "0" signal is supplied to F/F 3616 in response to next clock pulse $\overline{CK1}$, thereby restoring the initial state.

Signal RWVA-1 (FIG. 15H) from controller 362 is input to buffer 3614. Timing signal RWVA-2 (FIG. 15I) is input to the clock terminal of F/F 3622. The "1" signal is fetched to F/F 3622 in response to signal RWVA-2. Signal from F/F 3622 shown in FIG. 15M rises. Signal C from F/F 3622 is input to F/F 3623 in response to clock pulse CK1. F/F 3623 then outputs a "1" signal. In this case, if the output from inverter 3618 is set at logic "1", output signal d (FIG. 15N) from AND gate 3619 is set at logic "1" to enable buffers 3613 and 3614. Signal TVAS from converter 363 is then output as part of recording data TVR from buffer 3613. At the same time, signal RWVA-1 (FIG. 15H) is output as part of signal RWV-1 (FIG. 15P) from buffer 3614. Output signal d from AND gate 3619 is input to AND gate 3621 through OR gate 3620. Therefore, signal RWV-2 (FIG. 15Q) is output from AND gate 3621 in response to clock pulse $\overline{CK1}$. Signal d from AND gate 3619 is supplied to F/F 3624 in response to clock pulse $\overline{CK1}$ to clear F/F 3622, thereby restoring the initial state. The same operation as described above is then repeated. If F/F 3616 is set to set signal b to logic "1", the signal associated with the video signal is selected. However, if F/F 3623 is set to cause AND gate 3619 to output signal d of logic "1", the signal associated with the audio signal is selected. Recording data TVR output from buffers 3611 and 3613 is supplied to system 38 through switch circuit 41a.

When record/playback system 38 as best shown in FIG. 6 receives recording data TVR (FIG. 16E) from converter 36 and 15-Hz signal RSWVR (FIG. 16A) as signal RSW, switch circuits 381 and 384 are switched in response to signal RSWVR. Data TVR is alternately written in RAMs 382 and 383. More specifically, if signal RSWVR is set at L level, data TVR is interleaved and written in RAM 383. However, if signal RSWVR is set at H level, data TVR is interleaved and written in RAM 382. In this case, 128 blocks of 225-bit video signal and 23-bit audio signal are written in each of RAMs 382 and 383, i.e., a total of 256 blocks.

Generator 385 generates 60-Hz timing signal RC (FIG. 16B) and signal DR in response to signal RSWVR. Signal DR is supplied to RAMs 382 and 383 through switch circuit 386. In this case, switch circuits 381 and 384 are switched to supply signal DR to the RAMs alternately. If signal RSWVR is set at L level, signal TVVS is read out from RAM 382. However, if signal RSWVR is set at H level, signal TVVS is read out from RAM 383. If video mode V is selected by mode switch 23, switch circuit 3812 is connected to C3 parity generation/addition circuit 3810 in accordance with mode signal A/V. Assume that signal RSWVR is set at H level and data is read out from RAM 383. If timing signal RC goes high, switch circuit 388 is switched to generation/addition circuit 3810 side and, at the same time, switch circuit 3813 is turned on. As shown in FIGS. 12B and 16G, generation/addition circuit 3810 adds the C3 parity (vertical parity) of 128×8 bits to the video signal of 128×225 bits and the audio signal of 128×23 bits, which are read out from RAM 383. The sum data is then written in RAM 383. When signal RC goes low, switch circuit 388 is switched to the modulator 3811 side and, at the same time, switch circuit 3813 is turned off. Data read out from RAM 383 is supplied to modulator 381 through switch circuit 388. Modulator 3811 converts the TV signal with the C3 parity to a signal having a spectrum suitable for magnetic recording. This signal is output to record/playback head unit 3816, and is recorded on DAT tape 14 by head AH. In this case, since input signal RSWVR has a frequency of 15 Hz, rotary drum 3817 is rotated at 1,800 rpm. When signal RC is set at L level, controller 3818 controls rotation of drum 3817 such that heads AH and BH are sequentially brought into contact with DAT tape 14. When signal RC is set at H level again, switch circuit 388 is switched to the generation/addition circuit 3810 side and, at the same time, switch circuit 3813 is closed. The next data read out from RAM 383, as shown in FIG. 16G, is supplied to generation/addition circuit 3810 and is added with the C3 parity of 128×8 bits. The sum data is stored in RAM 383. The data written in RAM 383 is supplied to modulator 3811 through switch circuit 388 when signal RC is then set at L level. Modulator 3811 converts the TV signal with the C3 parity to a signal suitable for magnetic recording. This signal is output to head unit 3816 and recorded on DAT tape 14 by head BH.

In order to playback the TV signal recorded on DAT tape 14, TV band switch 22 is turned OFF and, at the same time, switch 23 is switched to the video mode V position. The PLAY key of switches 18 is then depressed. When switch 22 is turned OFF, switch circuits 34a to 34c and 45 are switched to supply 15-Hz signal RSWVP as signal RSW from reconverter 39 to system 38 through switch circuits 45 and 41c. Upon depression of the PLAY key in this state, the data recorded on DAT tape 14 is read out by head unit 3816 and is supplied to demodulator 3822 through amplifier 3821. Demodulator 3822 demodulates the playback signal and supplies it to RAM 3829 or 3830 through switch circuit 3823 and 3828. In this case, timing generator 3827 produces 15-Hz signal DW in response to signal RSWVP from reconverter 39, and alternately supplies it to RAMs 3829 and 3830 through switch circuit 3831. At the same time, generator 3827 generates 60-Hz signal WC to alternately switch switch circuit 3823 to the demodulator 3822 side or the switch circuit 3826 side. In a state where signal RSWVP is set at H level (FIG. 17A) and switch circuits 3828 and 3833 are switched to the RAM 3829 side, if signal WC (FIG. 17B) goes high, switch circuit 3834 is opened, and at the same time switch circuit 3823 is switched to the demodulator 3822 side. The TV signal is then read out by head AH and written in RAM 3829. In the playback mode, controller 3818 controls rotation of drum 3817 such that heads AH and BH are sequentially brought into contact with tape 14 at the leading edge of signal WC. As described above, data recorded is read out by head AH. When signal WC goes low, switch circuit 3823 is switched to the switch circuit 3826 side and, at the same time, switch circuit 3834 is closed. In the video mode, since switch circuit 3826 is switched to the circuit 3825 side in response to mode signal A/V, the TV signal written in RAM 3829 is supplied to correction circuit 3825 through switch circuits 3833 and 3834. Correction circuit 3825 detects error data according to the C3 parity signal, thereby correcting the data stored in RAM 3829. When signal WC goes high, the TV signal read out by head BH is written in RAM 3829, and the playback signal is supplied to correction circuit 3825 and error-corrected thereby in response to the trailing edge of signal WC.

When write error correction of the TV signal in RAM 3829 is completed and signal RSWVP goes low, TV signal write error correction for RAM 3830 is performed in the same manner as in RAM 3829, as shown in FIG. 17D.

The TV signals written in RAMs 3829 and 3830 are read out in response to signal RRV (FIGS. 18J and 18K), as signal RR, supplied from reconverter 39. These TV signals are alternately selected by switch circuit 3835. Switch circuit 3835 is switched to the RAM 3830 side when signal RSWVP is set at H level. When signal RSWVP is set at L level, switch circuit 3835 is switched to the RAM 3829 side. The TV signal is then read out from the RAM currently free from write operation. In this case, addressing control of RAMs 3829 and 3830 in the playback mode allows deinterleaving of data interleaved and distributed within one segment in the recording mode, as shown in FIGS. 17C and 17D. Therefore, the readout data is restored to the original sequence. The TV signals alternately read out from RAMs 3829 and 3830 serve as playback output signals PV shown in FIG. 17E, and are supplied from system 38 to reconverter 39 through switch circuit 41d.

Reconverter 39 reads out the digital TV signal from system 38 to produce TV video signal TVVSP, TV audio signal TVAP, and TV sync signals TVSYNCP. The detailed operation of reconverter 39 will be described below. In reconverter 39 in FIGS. 9 and 10, controller 394 generates 15-Hz signal RSWVP in accordance with clock pulse CK, and supplies it to system 38. At the same time, controller 394 supplies signal RRVV to separator 391. Signal RRVV consists of signal RRVV-1 (FIG. 18A) and signal RRVV-2 (FIG. 18B). Signal RRVV-1 is supplied to buffer 3913 and signal RRVV-2 is input to F/F 3914. F/F 3914 receives the "1" signal supplied to its terminal D in response to signal RRVV-2, and outputs signal nal e (FIG. 18F) to F/F 3915. F/F 3915 then outputs signal f (FIG. 18G) in response to clock pulse CK1 (FIG. 18E). Signal f enables the gate of buffer 3913, and signal RRVV-1 is itself supplied as part of signal RRV-1 (FIG. 18J) to system 38. Signal f from F/F 3915 is supplied as part of signal RRV-2 (FIG. 18K) to system 38, through OR gate 3918. Together, signals RRV-1 and RRV-2 constitute signal RRV. In addition to the above, TV playback signal PV is read out from system 38 in response to signals RRV and RSWVP and input to latch 3911 in separator 391. Latch 3911 latches signal PV in response to latch clock i output from AND gate 3916, and outputs signal PVV (FIG. 18O) to latch 392. Latch 392 latches signal PVV in response to latch pulse CK2 from controller 394, and outputs it as digital signal TVVSP shown in FIG. 18Q. Signal f from F/F 3915 is also supplied to F/F 3917 in response to clock pulse $\overline{CK1}$. An output signal from F/F 3917 clears F/F 3914. Output e from F/F 3914 is then set at logic "0", and the signal of logic "0" is supplied to F/F 3915 in response to next clock pulse CK1, thereby restoring the initial state. While output f from F/F 3915 is set at logic "1" and the signal associated with the video signal is read out, output from inverter 3919 is set at logic "0". The gate of AND gate 3920 is thus disabled to gate the audio signal. Reconverter 39 reads out the video signal of the latter half of each frame, i.e., the second field from system 38 in the same manner as for the first field, as shown in FIG. 17F. Thus, the second field signal appears from reconverter 39 as signal TVVSP.

Controller 395 supplies signal RRVA-1 (FIG. 18C) to buffer 3921 and signal RRVA-2 (FIG. 18D) to F/F 3922 in response to clock pulse CK. F/F 3922 receives the "1" signal supplied to its terminal D in response to signal RRVA-2, and outputs signal shown in FIG. 18H. Signal g is supplied to F/F 3923 in response to clock pulse CK1, and thereafter, to AND gate 3920. In this case, if output f from F/F 3915 is set at logic "0" and the output from inverter 3919 is set at logic "1", output h from AND gate 3920 in FIG. 18I is set at logic "1" to enable buffer 3921. Signal RRVA-1 is supplied as part of signal RRV-1 (FIG. 18J) from buffer 3921 to system 38. At the same time, output signal h from AND gate 3920 is supplied as part of signal RRV-2 (FIG. 18K) to system 38, through OR gate 3918. Signals RRV-1 and RRV-2 are supplied as signal RRV to system 38, thereby reading out signal PV from system 38. Signal PV is latched by latch 3912 in response to output signal j (FIG. 18N) from AND gate 3924, and serves as signal PVA shown in FIG. 18P. Signal h from AND gate 3920 is also supplied to F/F 3925 in response to clock pulse $\overline{CK1}$. An output from F/F 3925 clears F/F 3922. Output signal from F/F 3922 is thus set at logic "0" and the signal of logic "0" is supplied to F/F 3922 in response to next clock pulse CK1, thereby restoring the initial state. The above operation is repeated to read out signal PV from system 38. Signal PV is separated into signals PVV and PVA. Signal PVV is latched by latch 392 in response to latch pulse CK2 output from controller 394, and appears as signal TVVSP shown in FIG. 18Q. Signal PVA from latch 3912 is latched in response to latch pulse CK3 from controller 395. This digital signal is converted by D/A converter 396 to an analog signal. Thereafter, the signal from converter 396 appears as signal TVAP shown in FIG. 18R.

Signal TVVSP from latch 392 and signals TVSYNCP from controller 394 are supplied to liquid crystal display panel driver 35 through switch circuits 34b and 34c in FIG. 2. The TV video signal is displayed on panel 11. Signal TVAP from D/A converter 396 is supplied to amplifiers 43a and 43b through switch circuits 34a, 42a, and 42b. Outputs from amplifiers 43a and 43b drive speakers 15a and 15b. The TV video and audio signals are thus played back.

Figure 19A:
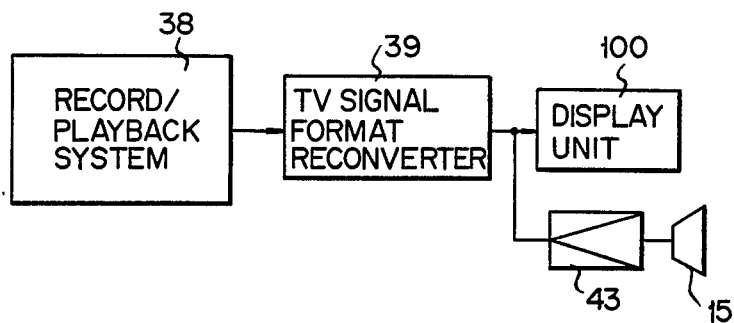
Figure 19B:
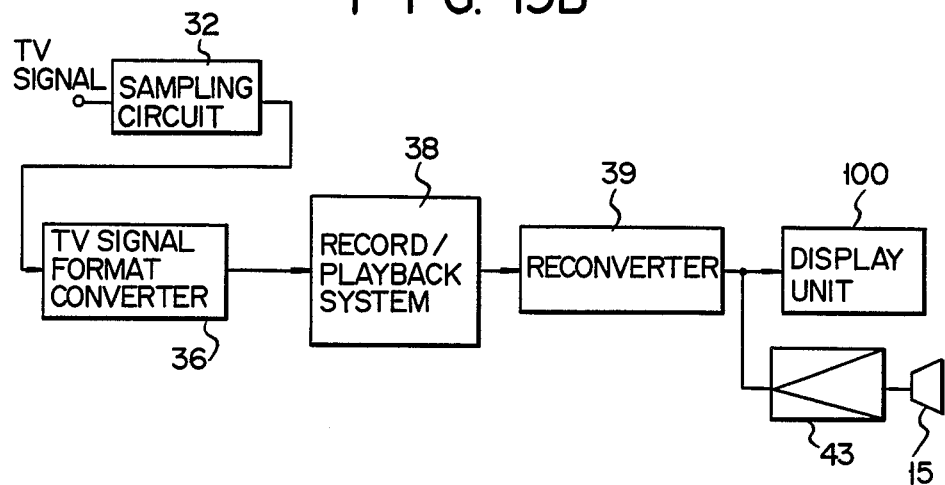

Other embodiments of the present invention will now be described, using the same components as the above apparatus. FIG. 19A shows another embodiment of a TV signal playback apparatus. The same reference numerals in FIGS. 19A to 19F denote the same units as in FIG. 2. It should be noted that switch circuits 34a to 34c are represented as switch circuit 34 and that other switch circuits are represented in the same manner as switch circuit 34. FIG. 19B shows still another embodiment of a TV signal record/playback apparatus comprising sampling circuit 32, TV signal converter 36, record/playback system 38, TV signal reconverter 39, unit 100 corresponding to driver 36 and the display panel in FIG. 2, amplifier 43, and speaker 15.

Figure 19C:
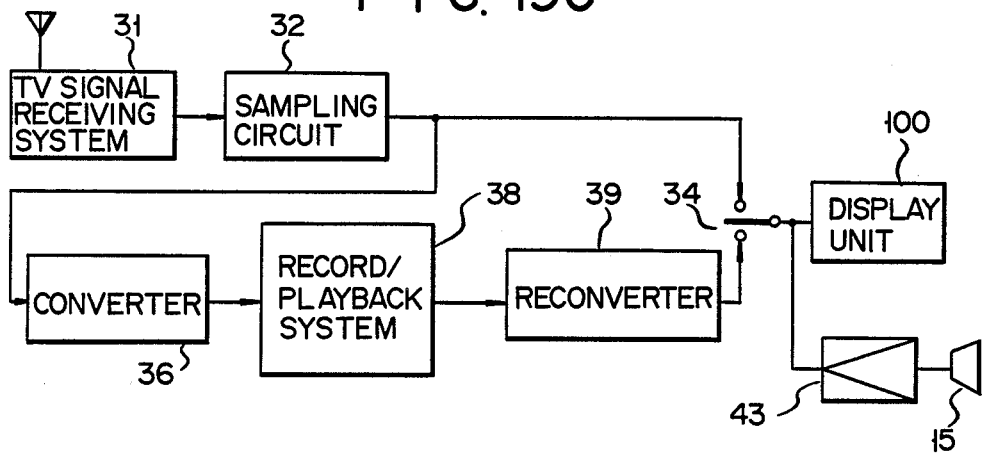

FIG. 19C shows still another embodiment of an apparatus for selectively performing TV signal recording/playback and image reception. This apparatus comprises receiving system 31, sampling circuit 32, TV signal converter 36, record/playback system 38, TV signal reconverter 39, unit 100, amplifier 43, switch circuit 34, and speaker 15.

Figure 19D:
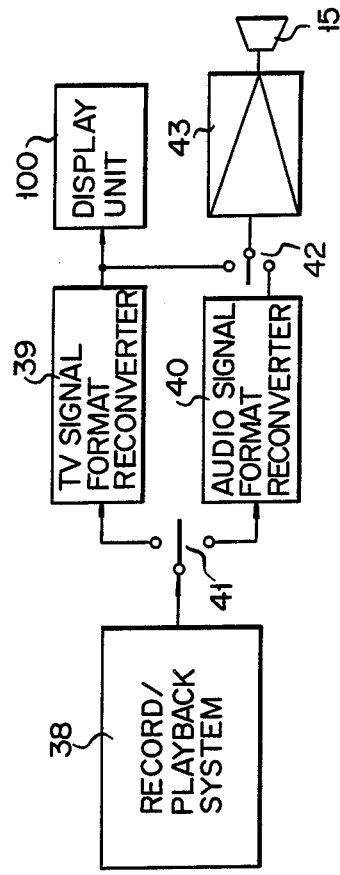

FIG. 19D shows still another embodiment of an apparatus for selectively performing TV and audio signal recording/playback. This apparatus comprises record/playback system 38, TV signal reconverter 39, audio signal reconverter 40, unit 100, amplifier 43, switch circuit 42, and speaker 15.

Figure 19E:
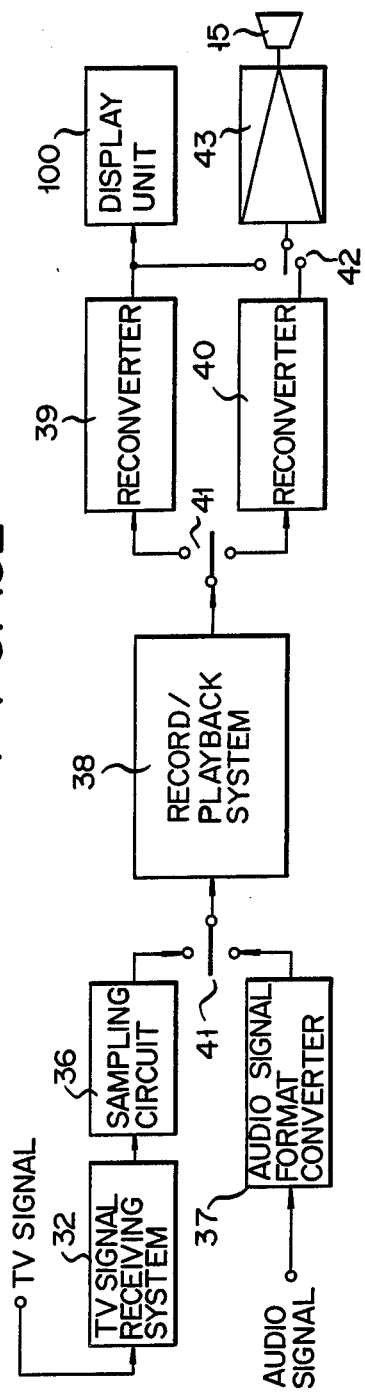

FIG. 19E shows still another embodiment of an apparatus selectively performing input or received TV or audio signal recording/playback. This apparatus comprises sampling circuit 32, TV signal converter 36, audio signal converter 37, switch circuit 41, record/playback system 38, TV signal reconverter 39, audio signal reconverter 40, unit 100, amplifier 43, switch circuit 42, and speaker 15.

FIG. 19F is a still another embodiment of an apparatus for selectively performing recording/playback of input or received TV or audio signal, image reception, and audio output operation. This apparatus comprises receiving system 31, switch circuit 101 for selectively supplying the TV signal to sampling circuit 32, audio signal tuner 51, switch circuit 102 for selecting an audio signal input to converter 37, sampling circuit 32, TV signal converter 36, audio signal converter 37, switch circuit 41, record/playback system 38, TV signal reconverter 39, audio signal reconverter 40, unit 100, amplifier 43, switch circuit 42, switch circuit 103 for selecting a signal input to amplifier 43, and speaker 15.

What is claimed is:
1. An apparatus for selectively recording/playing back television (TV) and audio signals by using a digital audio tape recorder (DAT) system, comprising:
television signal format converter means for converting an analog TV audio signal input from the external to a digital TV audio signal in response to a TV sync signal input from the external, outputting a digital TV signal comprising a digital TV video signal input from the external and the converted digital TV audio signal as a recording digital TV signal, and generating TV signal recording control signals RW (RAM-write control signal) and RSW (RAM designation switching signal);
audio signal format converter means for converting an analog audio signal input from the external to a digital audio signal and outputting the digital audio signal as a recording digital audio signal, and for generating audio signal recording control signals RW and RSW, said signal RSW having a frequency different from that of the TV signal recording control signal RSW;
television signal format reconverter means for generating TV signal playback control signals RR (RAM read control signal) and RSW and the playback TV sync signal, for receiving and separating a playback digital TV signal into a playback digital TV video signal and a playback digital TV audio signal, and for converting the playback digital TV audio signal to a playback analog TV audio signal to output the playback digital TV video signal and the playback analog TV audio signal, the TV signal playback control signal RSW having the same frequency as that of the TV signal recording control signal RSW;
audio signal format reconverter means for generating an audio signal playback control signal RR in response to the signal RSW from said audio signal format converter means, and for converting the input playback digital audio signal to a playback analog audio signal and outputting the playback analog audio signal;
first switching means for selectively outputting the signal RSW from said television signal format reconverter means and the signal RSW from said television signal format converter means in response to the DAT tape drive instruction;
liquid crystal display means, having an N×M dot matrix, for displaying a television image according to the digital TV video signal in response to the TV sync signal;
second switching means, to be selected according to one signal to be processed of TV signal and audio signal;
audio output means for selectively receiving and amplifying one of the analog audio signal and the analog TV audio signal and for generating an amplified audio;
third switching means, to be selected according to the digital TV video signal to be displayed on said liquid crystal display means, for selectively outputting one of a couple of the TV sync signal and the digital TV video signal input from the external, and a couple of the playback TV sync signal and the playback digital TV video signal from said television signal format reconverter means to said liquid crystal display means as digital TV video signal and TV sync signal, and for selectively outputting one of the analog TV audio signal input from the external and the playback analog TV audio signal from said television signal format reconverter means as the analog TV audio signal;
DAT tape driving means for driving a rotary head according to the frequency of the signal RSW in response to the DAT tape drive instruction, reading a playback digital signal with parity data from said DAT tape in response to the read instruction in the DAT tape drive instruction, and writing a recording digital signal with parity data on said

DAT tape in response to the write instruction in the DAT tape drive instruction;

fourth switching means, switched in response to selection of said second switching means, for selectively outputting one of a group of signal RR from said television format reconverter means, signal RW and the recording digital TV signal from said television signal format converter means and signal RSW from said first switching means, and a group of signal RR from said audio signal reconverter means and signal RW, the recording digital audio signal and signal RSW from said audio signal converter means to signal recording/playback processing means as signal RR, signal RW, the recording digital signal and signal RSW, respectively, and for selectively supplying the playback digital signal input thereto to said television signal format reconverter means as the playback digital TV signal and said audio signal format reconverter means as the playback digital audio signal, and for selectively outputting one of the analog audio signal and the TV audio signal from said third switching means to said audio output means; and signal recording/playback processing means, having a RAM divided into four RAM portions, for selectively storing the recording digital signal from said fourth switching means to first and second RAM portions in response to the signal RW from said fourth switching means based on the signal RSW from said fourth switching means, for adding different parity data to the recording digital signal according to selection of said second switching means, for selectively supplying the digital signal with parity data stored in one of said first and second RAMs as the recording digital signal with parity data to said DAT tape driving means in response to the signal RSW, and for selectively supplying the playback digital signal with parity data from said DAT tape driving means to third and fourth RAM portions in response to the signal RSW, checking the parity data in the playback digital signal with parity data in response to the signal RR from said fourth switching means based on the signal RSW and the selection of said second switching means, correcting the playback digital signal if a parity error is detected, and outputting the playback digital signal free from the parity error to said fourth switching means.

2. The apparatus according to claim 1, wherein said liquid crystal display means comprises:

a liquid crystal display panel of 120×160 dots; and liquid crystal driving means for driving said liquid crystal display panel according to the digital TV video signal from said third switching means in response to the TV sync signal from said third switching means.

3. The apparatus according to claim 1, wherein said DAT tape driving means comprises:

a rotary drum having K heads spaced apart by a predetermined distance, said K heads being arranged to record or play back the digital signal with parity data with respect to said DAT tape;

rotary driving means for driving said rotary drum in response to a first timing signal; and drum motor drive control means for supplying said rotary driving means to the first timing signal, having a frequency based on the frequency of the signal RSW, in response to the signal RSW and the DAT tape drive instruction.

4. The apparatus according to claim 3, wherein said rotary drum has two heads, said television signal format converter means includes means for generating the signal RSW having a frequency of 15 Hz for digital TV signal recording, said television signal format reconverter means includes means for generating the signal RSW having a frequency of 15 Hz for digital TV signal playback, said audio signal format converter means includes means for generating the signal RSW having a frequency of 16.6 Hz for recording and playing back the digital audio signal, and said drum motor drive control means includes means for controlling said rotary driving means by the first timing signal, such that said rotary drum is rotated at 1,800 rpm when the signal recorded on said DAT tape is the digital TV signal and at 2,000 rpm when the signal recorded in said DAT tape is the digital audio signal.

5. The apparatus according to claim 1, wherein said recording/playback signal processing means comprises:

first, second, third, and fourth RAMs comprising said four RAM portions;

first pulse generating means for generating a signal DR (data read control signal) and a signal RC (read control signal), having a frequency $2 \times K$ times the frequency of the signal RSW, in response to the signal RSW;

modulating means for modulating and amplifying the digital signal with parity data and supplying an amplified digital signal with parity data to the rotary heads;

parity adding means for adding a parity data to the recording digital signal input thereto in response to the signal RC and selection of said second switching means;

fifth switching means for selectively supplying the digital signal with parity data output from one of said first and second RAMs to said modulating means and the recording digital signal to said parity adding means, in response to the signal RC;

first control means for selectively outputting the recording digital signal input thereto and the signal RW to one of said first and second RAMs in response to the signal RSW, outputting the signal DR to the one of said first and second RAMs, which does not currently receive the signal RW, in response to the signal RSW, outputting the digital signal with the parity data added by said parity adding means to one of said first and second RAMs, which does not correctly receive the signal RW in response to the signal DR, and selectively outputting one of the recording digital signal and the recording digital signal with parity data from one of said first and second RAMs with supply of signal DR to said fifth switching means;

second pulse generating means for generating a signal DW (data write control signal) and a signal WC (write control signal), having a frequency $2 \times K$ times that of the signal RSW, in response to the input signal RSW;

demodulating means for demodulating the playback digital signal with parity data read by the rotary heads;

parity correcting means for receiving the playback digital signal with parity data in response to the signal WC, checking the parity data in the playback digital signal with parity data according to selection of said second switching means, correcting the playback digital signal if a parity error is detected, and outputting the playback digital signal free from the parity error;

sixth switching means for selectively outputting the playback digital signal with parity data from said demodulating means and the corrected digital signal from said parity correcting means, in response to the signal WC; and second control means for selectively supplying the signal RR to said third and fourth RAMs in response to the signal RSW to supply one of the stored playback digital signal and the stored digital signal with parity data to said sixth switching means, supplying the signal DW to the one of said third and fourth RAMs which does not currently receive the signal RR, in response to the signal RSW, to read out the digital signal from said one of said first and second RAMs, and supplying the digital signal selected by said sixth switching means to one of said third and fourth RAMs.

6. The apparatus according to claim 5, wherein said parity adding means comprises:

C1 and C2 parity adding means for adding parities C1 and C2 to the recording digital audio signal, and outputting the digital audio signal with the C1 and C2 parities;

C3 parity adding means for adding a parity C3 to the recording digital TV signal, and outputting the digital TV signal with the C3 parity; and seventh switching means for selectively outputting the digital signals with parity data from said C1 and C2 and C3 parity adding means according to selection of said second switching means.

7. The apparatus according to claim 6, wherein said parity correcting means comprises:

C1 and C2 parity correcting means for checking the C1 and C2 parities of the playback digital audio signal with parity data, correcting the playback digital audio signal if a parity error is detected, and outputting the playback digital audio signal free from the parity error;

C3 parity correcting means for checking the parity of the playback digital TV signal with parity data, correcting the playback digital TV signal if a parity error is detected, and outputting the playback digital TV signal free from the parity error; and eighth switching means for selectively outputting the playback digital signals from said C1 and C2 and C3 parity correcting means according to selection of said second switching means.

8. The apparatus according to claim 1, wherein said TV signal format converter means comprises:

television audio signal write control means for generating a TV audio signal recording control signal RW and a first sampling clock in response to the TV sync signal input from the external and the master clock;

television audio signal A/D converter means for receiving the analog TV audio signal input from the external, converting the analog TV audio signal to the digital TV audio signal in response to the first sampling clock from said television audio signal write control means, and outputting the digital TV audio signal;

television video signal write control means for generating the TV video signal recording control signals RW and RSW in response to the TV sync signal from the external and the master clock; and selecting means for combining the digital TV video signal from the external and the digital TV audio signal from said television audio signal A/D converter means to produce the recording digital TV signal in response to the master clock, and for combining the TV video signal recording control signal RW and the TV audio signal recording control signal RW to produce the television signal recording control signal RW.

9. The apparatus according to claim 8, which further comprises television video signal sampling means for sampling N scanning lines of an analog TV video signal of one field in response to the TV sync signal, and sampling each of the N scanning lines to M data signals, to convert the analog TV video signal to the digital TV video signal, and supplying the digital TV video signal to said television signal format converter means and said third switching means.

10. The apparatus according to claim 9, which further comprises:

television signal receiving means for receiving the TV signal, separating the received TV signal into the TV video, audio and sync signals, and outputting the TV video, audio and sync signals;

television signal input means for inputting the TV signal comprising the TV video, audio and sync signals; and ninth switching means for selectively outputting the TV signals from said television signal receiving means and from said television signal input means.

11. The apparatus according to claim 9, wherein said liquid crystal display means includes a liquid crystal display panel of 120×160 dots, said television video signal sampling means includes means for sampling 120 scanning lines among scanning lines of the analog TV video signal from the external in 1/30 second, sampling each of the 120 scanning lines for 160 data signals, and converting each data signal to a 3-bit digital signal, said television video signal write control means includes means for generating the TV video signal recording control signal RW to write the digital TV video signal from said television video signal sampling means in said RAM in said signal record/playback processing means according to a DAT format, the digital TV video signal being stored as one 225-bit data over 256 blocks, said television audio signal A/D converter means includes means for sampling the analog TV audio signal from the external in response to the first sampling pulse and converting each sampled data to a 7-bit digital TV audio signal, said television audio signal write control means includes means for generating the first sampling clock so as to perform 800 sampling cycles in 1/30 second, and means for generating the TV audio signal recording control signal RW to write the digital TV audio signal from said television audio signal A/D converter means in said RAM in said signal record/playback processing means according to the DAT format, the digital TV video signal being stored as one 23-bit data over the 256 blocks, and said signal record/playback processing means includes means for adding 8-bit parity data to the digital television signal in said RAM within the 256 blocks according to the DAT format.

12. The apparatus according to claim 8, wherein said selecting means includes means for generating a selection pulse in response to the master clock and the clock pulse in the TV video signal recording control signal RW, outputting the digital TV video signal and the address signals of the television video signal recording control signal RW in response to the selection pulse, and outputting the digital TV audio signal and address signals of the television audio signal recording control signal RW, in response to the master clock and the clock pulse in the television audio signal recording signal RW when the selection pulse is disabled.

13. The apparatus according to claim 8, wherein said television signal format reconverter means comprises:
separating means for receiving the playback digital TV signal from said signal record/playback processing means through said fourth switching means in response to the master clock, separating the playback digital TV signal into the playback digital TV video signal and the playback digital TV audio signal, receiving and combining the TV video signal playback control signal RR and the TV audio signal playback control signal RR, and supplying as the TV signal playback control signal RR the combined signal RR to said fourth switching means;

television video signal read control means for receiving the playback digital TV video signal from said separating means in response to the master clock, latching and outputting the playback digital TV video signal to said third switching means, and supplying the playback TV sync signal, the TV signal playback control signal RSW, and the TV video signal playback control signal RR to said separating means; and television audio signal read control means for receiving and latching the playback digital TV audio signal from said separating means in response to the master clock and the TV sync signal from said television video signal read control means, converting the playback digital TV audio signal to the playback analog TV audio signal, supplying the playback analog TV audio signal to said third switching means, and supplying the television audio signal playback signal RR to said separating means.

14. The apparatus according to claim 13, wherein said separating means includes means for generating a second selection pulse in response to the master clock and a second clock pulse in the TV video signal playback control signal RR, outputting the address signal of the TV video signal playback control signal RR to said fourth switching means in response to the second selection pulse, outputting the playback digital TV signal derived from the playback digital TV signal from said fourth switching means to said television video signal read control means, and when the second selection pulse is disabled, outputting the address signal of the TV audio signal playback control signal RR to said fourth switching means in response to the clock pulse and the master pulse for the television audio signal playback signal RR, and outputting the playback digital TV audio signal derived from the playback digital TV signal from said fourth switching means to said television audio signal read control means.

15. The apparatus according to claim 1, which further comprises:
audio signal receiving means for receiving an FM audio signal, separating the received FM audio signal into right- and left-channel audio signals, and outputting the right- and left-channel audio signals;
audio signal input means for inputting the FM audio signal comprising the right- and left-channel audio signals; and
tenth switching means for selectively outputting the FM audio signals from said audio signal receiving means and from said audio signal input means.

16. The apparatus according to claim 1, which further comprises:
second television signal receiving means for receiving the TV signal, separating the received TV signal into the TV video, audio and sync signals, and outputting the TV video, audio and sync signals;
second television signal input means for inputting the TV signal comprising the TV video, audio and sync signals;
eleventh switching means for selectively outputting the TV signal from said television signal receiving means and from said television signal input means;
second television signal sampling means for converting the analog TV video signal from said eleventh switching means to the digital TV video signal suitable for said liquid crystal display means, in response to the TV sync signal, and outputting the converted digital TV video signal to said television signal format converter means;
second audio signal receiving means for receiving an FM audio signal, separating the FM audio signal into right- and left-channel audio signals, and outputting the right- and left-channel audio signals;
second audio signal input means for receiving the FM audio signal comprising the right- and left-channel audio signals; and
twelfth switching means for selectively receiving the FM audio signals from said audio signal receiving means and said audio signal input means.

17. The apparatus according to claim 1, wherein said first RAM and said third RAM are same, and said second RAM and said fourth RAM are same, and said signal recording/playback processing means further includes thirteenth switching means for switching data and control signals input to and output from said first and third RAMs based on the DAT tape drive instruction.

18. An apparatus for recording/playing back a signal with a sync signal by using a digital audio tape recorder (DAT) system, comprising:
first control signal generating means for generating first and second control signals according to the sync signal to record the input signal;
converting means for converting an input signal to a PCM signal having a predetermined bit length within 256 bits and a predetermined block size within 256 blocks in response to the first and second control signals;
DAT tape driving means for driving a rotary head in response to a fourth control signal of a frequency based on that of a selected one of the first control signal and a third control signal based on the DAT tape drive instruction, outputting the playback digital signal from said DAT tape in response to a read instruction in the DAT tape drive instruction, and writing an input recording digital signal on said DAT tape in response to a write instruction in the DAT tape drive instruction;

PCM signal recording/playback processing means for receiving the PCM signal converted according to the first and second control signals, supplying the recording digital signal derived from the PCM signal to said DAT tape driving means in response to the fourth control signal, receiving the playback digital signal from said DAT tape driving means in response to the fourth control signal, and outputting a playback PCM signal derived from the playback digital signal in response to the third control signal and a fifth control signal;

second control signal generating means for generating the third and fifth control signals and the playback sync signal to playback the playback PCM signal; and reconverting means for reconverting the playback PCM signal from said PCM signal recording/playback processing means to the same signal as input to said converting means.

19. The apparatus according to claim 18, wherein said PCM signal record/playback processing means further comprises parity adding means for adding a parity data to the input PCM signal to produce the recording digital signal suitable for a DAT format.

20. The apparatus according to claim 19, wherein said PCM signal record/playback processing means further comprises correcting means for checking the parity of the playback digital signal read out from said DAT tape, and correcting the digital signal if a parity error is detected.

* * * * *